United States Patent
Lee et al.

(10) Patent No.: US 10,564,911 B2
(45) Date of Patent: Feb. 18, 2020

(54) ELECTRONIC APPARATUS AND METHOD FOR DISPLAYING OBJECT

(71) Applicant: Samsung Electronics Co., Ltd., Gyeonggi-do (KR)

(72) Inventors: Jae-Ik Lee, Gyeonggi-do (KR); Ji-Yeon Kwak, Seoul (KR); Hyo-In Ahn, Seoul (KR)

(73) Assignee: Samsung Electronics Co., Ltd (KR)

( * ) Notice: Subject to any disclaimer, the term of this patent is extended or adjusted under 35 U.S.C. 154(b) by 162 days.

(21) Appl. No.: 15/498,079

(22) Filed: Apr. 26, 2017

(65) Prior Publication Data

US 2017/0308216 A1   Oct. 26, 2017

(30) Foreign Application Priority Data

Apr. 26, 2016 (KR) .................. 10-2016-0050665

(51) Int. Cl.
| | |
|---|---|
| *G06F 3/14* | (2006.01) |
| *G06F 3/0488* | (2013.01) |
| *G06F 1/16* | (2006.01) |
| *G06F 3/0484* | (2013.01) |
| *G06F 3/044* | (2006.01) |

(52) U.S. Cl.
CPC .......... *G06F 3/1423* (2013.01); *G06F 1/1647* (2013.01); *G06F 3/0488* (2013.01); *G06F 3/04842* (2013.01); *G06F 3/044* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 6,466,202 B1 | 10/2002 | Suso et al. | |
| 7,205,959 B2* | 4/2007 | Henriksson | G09F 9/00 345/169 |
| 8,629,848 B2* | 1/2014 | Tani | G06F 1/1622 345/173 |
| 8,787,978 B2* | 7/2014 | Inami | H04M 1/0235 455/566 |
| 8,943,427 B2* | 1/2015 | Heo | G06F 1/1647 715/768 |
| 9,489,080 B2* | 11/2016 | Seo | G06F 1/1641 |
| 9,509,360 B2* | 11/2016 | Rhee | H04B 1/3888 |
| 9,727,146 B2* | 8/2017 | Kang | G06F 3/03 |

(Continued)

FOREIGN PATENT DOCUMENTS

| | | |
|---|---|---|
| JP | 2000-253113 | 9/2000 |
| JP | 5520918 | 6/2014 |

(Continued)

OTHER PUBLICATIONS

International Search Report dated Jul. 28, 2017 issued in counterpart application No. PCT/KR2017/004464, 9 pages.

*Primary Examiner* — Patrick F Marinelli
(74) *Attorney, Agent, or Firm* — The Farrell Law Firm, P.C.

(57) ABSTRACT

Disclosed is an electronic apparatus having a first display and a second display, and a processor which may detect a pressure touch that is input on an object displayed on either of the first and second displays, and may display the object on the other of the first and second displays corresponding to the pressure touch.

10 Claims, 20 Drawing Sheets

(56) References Cited

U.S. PATENT DOCUMENTS

| | | | | |
|---|---|---|---|---|
| 9,865,224 B2* | 1/2018 | Yun, II | .................... | G09G 5/006 |
| 2005/0052341 A1* | 3/2005 | Henriksson | ............... | G09F 9/00 |
| | | | | 345/4 |
| 2007/0052616 A1* | 3/2007 | Yoon | ................. | G06F 17/30905 |
| | | | | 345/1.1 |
| 2009/0298548 A1* | 12/2009 | Kim | ................. | H04M 1/72544 |
| | | | | 455/566 |
| 2011/0143815 A1* | 6/2011 | Inami | .................. | H04M 1/0235 |
| | | | | 455/566 |
| 2011/0187655 A1* | 8/2011 | Min | ...................... | G06F 1/1643 |
| | | | | 345/173 |
| 2012/0060089 A1* | 3/2012 | Heo | ...................... | G06F 1/1647 |
| | | | | 715/702 |
| 2014/0035942 A1* | 2/2014 | Yun | ........................ | G09G 5/006 |
| | | | | 345/592 |
| 2014/0123038 A1* | 5/2014 | Ahn | ...................... | G06F 3/0488 |
| | | | | 715/761 |
| 2015/0067519 A1 | 3/2015 | Missig et al. | | |
| 2015/0234507 A1* | 8/2015 | Chun | .................... | G06F 1/1616 |
| | | | | 345/173 |
| 2015/0309691 A1* | 10/2015 | Seo | ........................ | G06F 1/1641 |
| | | | | 345/173 |
| 2015/0378503 A1* | 12/2015 | Seo | ........................ | G06F 1/1641 |
| | | | | 345/173 |
| 2016/0110010 A1* | 4/2016 | Lee | ........................ | G06F 1/1624 |
| 2016/0150061 A1* | 5/2016 | Tani | .................... | H04M 1/0237 |
| | | | | 455/566 |
| 2017/0139496 A1* | 5/2017 | Kang | ...................... | G06F 3/041 |
| 2017/0206634 A1* | 7/2017 | Goldberg | ............... | G06Q 10/10 |
| 2017/0308216 A1* | 10/2017 | Lee | ........................ | G06F 3/0414 |
| 2018/0059717 A1* | 3/2018 | Kim | ........................ | G06F 1/1626 |

FOREIGN PATENT DOCUMENTS

| | | |
|---|---|---|
| KR | 1020100027867 | 3/2010 |
| KR | 10-1445976 | 10/2014 |
| KR | 10-1457999 | 11/2014 |
| KR | 1020140136771 | 12/2014 |

\* cited by examiner

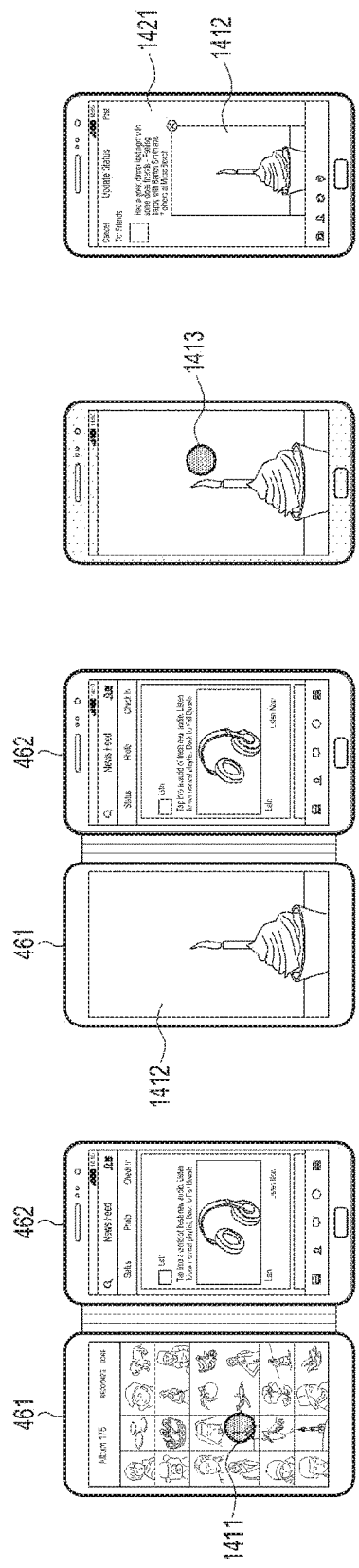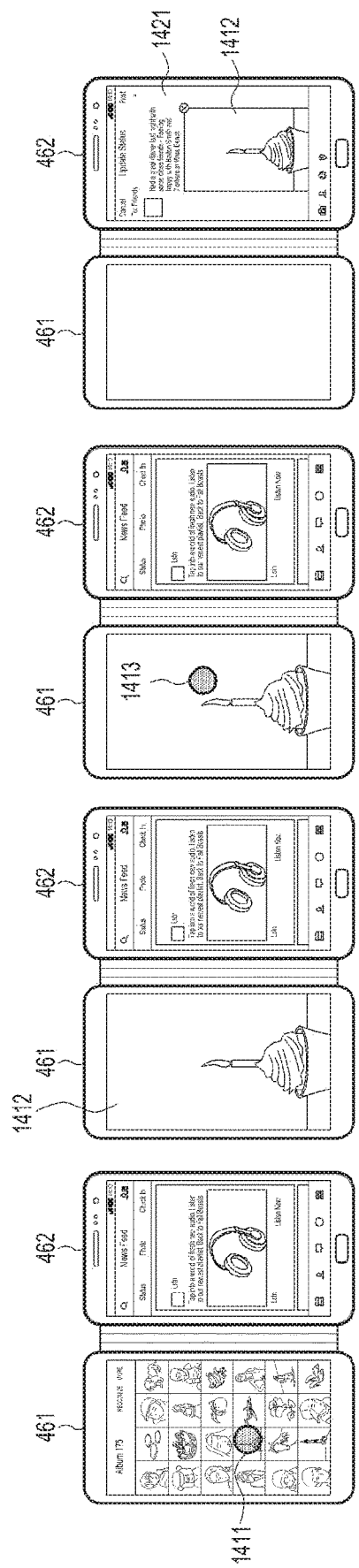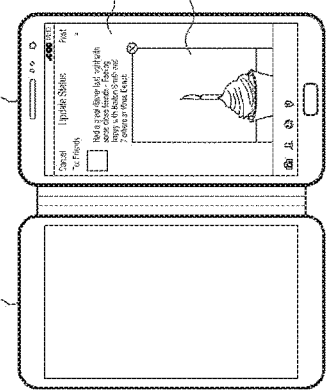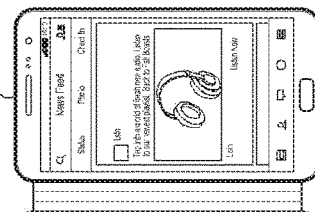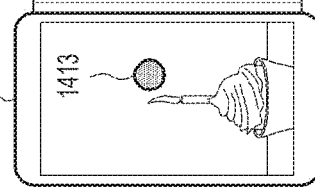

ELECTRONIC APPARATUS AND METHOD FOR DISPLAYING OBJECT

PRIORITY

This application claims priority under 35 U.S.C. § 119(a) to a Korean Patent Application which was filed in the Korean Intellectual Property Office on Apr. 26, 2016 and assigned Serial No. 10-2016-0050665, the contents of which are incorporated herein by reference.

BACKGROUND

1. Field of the Disclosure

The present disclosure relates generally to an electronic apparatus, and more particularly, to an electronic apparatus and a method for displaying an object.

2. Description of the Related Art

Electronic apparatuses have evolved to a point where they now provide a wider variety of services and functions than ever before. To improve the utility of electronic apparatuses and to meet diverse demands from users, communication service providers or electronic apparatus manufacturers are competitively developing electronic apparatuses in order to provide diverse functions.

An electronic apparatus tends to have an enlarged display for visual convenience to users, and an electronic apparatus equipped with at least two displays has been developed.

Conventionally, one of the at least two displays is manufactured as transparent to ensure that a screen is not blocked even when the displays are overlapping, rendering it impossible to control an object displayed on the rear display.

As such, there is a need in the art for the ability to control an object displayed on the rear display when the at least two displays are overlapping in an electronic device including at least two displays.

SUMMARY

An aspect of the present disclosure is to address at least the above-mentioned problems and/or disadvantages and to provide at least the advantages described below.

Another aspect of the present disclosure is to provide an electronic apparatus and a method that are capable of transmitting and receiving an object between displays based on a pressure touch in the electronic apparatus including at least at least two displays.

According to an aspect of the present disclosure, an electronic apparatus includes a first display, a second display, and at least one or more processor, wherein the processor is configured to detect a pressure touch that is input on an object displayed on either of the first display and the second display, and display the object on another of the first display and the second display, corresponding to the pressure touch.

According to another aspect of the present disclosure, a method of displaying an object by an electronic apparatus that includes a first display, a second display, and at least one or more processor includes detecting a pressure touch that is input on an object displayed on either of the first display and the second display, and displaying the object on another of the first display and the second display, corresponding to the pressure touch.

According to another aspect of the present disclosure, a non-transitory computer-readable recoding medium is provided, having recorded thereon a program for performing a method to display an object in an electronic apparatus that includes a first display, a second display, and at least one or more processor, the method including detecting a pressure touch that is input on an object displayed on either of the first display and the second display, and displaying the object on another of the first display and the second display, corresponding to the pressure touch.

BRIEF DESCRIPTION OF THE DRAWINGS

The above and other aspects, features, and advantages of the present disclosure will be more apparent from the following detailed description taken in conjunction with the accompanying drawings, in which:

FIGS. 14A, 14B, 14C, 14D, 14E, 14F, 14G and 14H illustrate an interaction on an object between the first display and the second display by a tap or pressure touch according to embodiments of the present disclosure.

DETAILED DESCRIPTION

Figure 1:
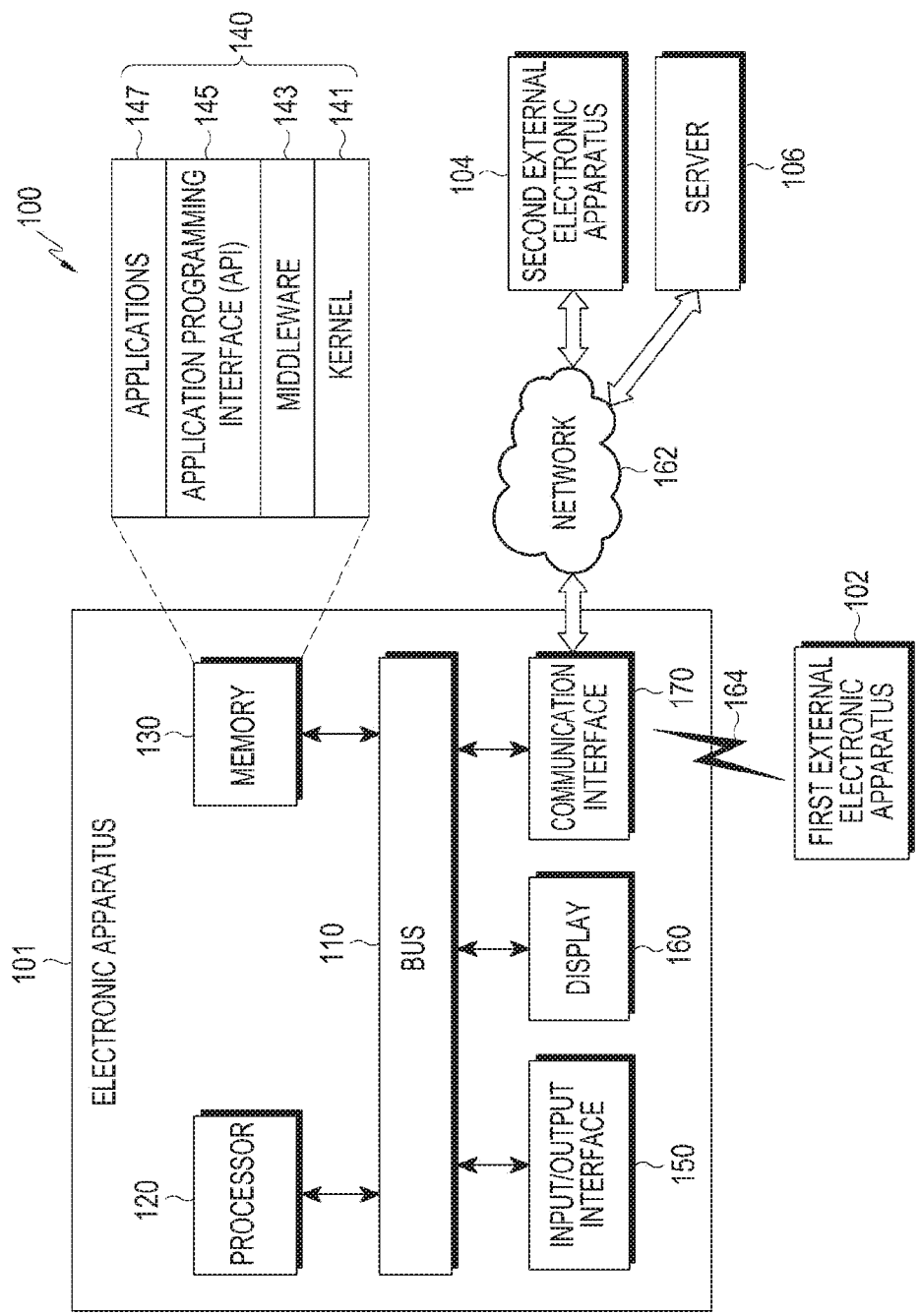
FIG. 1 illustrates an electronic apparatus in a network environment according to embodiments of the present disclosure.

Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", and "may include" refer to the existence of a corresponding feature, such as a numeral, function, operation, or component, and do not exclude one or more additional features.

In the present disclosure, the expressions "A or B", "at least one of A or/and B", and "one or more of A or/and B" may include all possible combinations of the items listed, and refer to any of (1) including at least one A, (2) including at least one B, and (3) including all of at least one A and at least one B.

The expressions "a first", "a second", "the first", and "the second" used in embodiments of the present disclosure may modify various components regardless of the order and/or the importance but do not limit the corresponding components. For example, a first user device and a second user device indicate different user devices although both are user devices. A first element may be referred to as a second element, and similarly, a second element may be referred to as a first element without departing from the scope of the present disclosure.

It should be understood that when an element, such as a first element, is referred to as being operatively or communicatively "connected," or "coupled," to another element, such as a second element, the first element may be directly connected or coupled to the second element or any other element, such as a third element, may be interposed between the first and second elements. In contrast, it may be understood that when the first element is referred to as being "directly connected," or "directly coupled" to the second element, there is no third element interposed between the first and second elements.

The expression "configured to" used in the present disclosure may be used interchangeably with "suitable for", "having the capacity to", "designed to", "adapted to", "made to", or "capable of" according to the situation, and may not necessarily imply "specifically designed to" in hardware. Alternatively, in some situations, the expression "device configured to" may indicate that the device, together with other devices or components, "is able to". For example, the phrase "processor adapted (or configured) to perform A, B, and C" may indicate an embedded processor only for performing the corresponding operations or a generic-purpose processor, such as a central processing unit (CPU) or application processor (AP) that can perform the corresponding operations by executing one or more software programs stored in a memory device.

The terms used herein are merely for the purpose of describing particular embodiments and are not intended to limit the scope of other embodiments of the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

An electronic device according to embodiments of the present disclosure may include at least one of a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device which may include at least one of an accessory type, such as a watch, ring, bracelet, anklet, necklace, glasses, contact lens, or a head-mounted device (HMD), a fabric or clothing integrated type, such as an electronic clothing, a body-mounted type, such as a skin pad, or tattoo, and a bio-implantable type, such as an implantable circuit.

According to some embodiments, the electronic device may be a home appliance. The smart home appliance may include at least one of a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box, such as Samsung HomeSync™, Apple TV™, or Google TV™, a game console, such as Xbox™ and PlayStation™, an electronic dictionary, an electronic key, a camcorder, a charging device and an electronic photo frame.

According to another embodiment, the electronic device may include at least one of various medical devices, such as a blood glucose monitoring device, a heart rate monitoring device, a blood pressure measuring device, or a body temperature measuring device, a magnetic resonance angiography (MRA) device, a magnetic resonance imaging (MRI) device, a computed tomography (CT) machine, and an ultrasonic machine, a navigation device, a global positioning system (GPS) receiver, an event data recorder (EDR), a flight data recorder (FDR), a vehicle infotainment device, an electronic device for a ship, such as a navigation device and a gyro-compass, avionics, security devices, an automotive head unit, a robot, an automated teller machine (ATM), point of sales (POS) device, or Internet of things (IoT) device, such as a light bulb, various sensors, electric or gas meter, a sprinkler device, a fire alarm, a thermostat, a streetlamp, a toaster, a sporting goods, a hot water tank, a heater, or a boiler.

According to some embodiments, the electronic device may include at least one of a part of furniture or a building/structure, an electronic board, an electronic signature receiving device, a projector, and various types of measuring instruments, such as a water, electric, gas, and radio wave meter. In embodiments, the electronic device may be a combination of one or more of the aforementioned various devices, and may also be a flexible device. The electronic device herein is not limited to the aforementioned devices, and may include a new electronic device according to the development of new technology.

In the present disclosure, the term "user" may indicate a person using an electronic device or, such as an artificial intelligence electronic device using an electronic device.

According to embodiments of the present disclosure, an electronic apparatus including at least two displays may transmit and receive an object between the displays based on a pressure touch, thereby enhancing user convenience.

The present disclosure may detect a pressure touch that is input on an object displayed on any one of a first display and a second display and may display the object on the other display corresponding to the pressure touch, further enhancing user convenience.

FIG. 1 illustrates an electronic apparatus 101 in a network environment 100 according to embodiments of the present disclosure.

The electronic apparatus 101 may include a bus 110, a processor 120, a memory 130, an input/output interface 150, a display 160, and a communication interface 170. At least one of the components may be omitted or an additional component may be further included in the electronic apparatus 101.

The bus 110 may include a circuit that connects the components 110 to 170 to each other and delivers communications, such as control messages or data, between the components.

The processor 120 may include one or more of a central processing unit, an application processor, and a communication processor (CP), and may control at least one different component of the electronic apparatus 101 and/or may perform an operation relating to communication or data processing.

The memory 130 may include a volatile and/or nonvolatile memory and may store a command or data related to at least one different component of the electronic apparatus 101. According to an embodiment, the memory 130 may store software and/or a program 140 such as a kernel 141, middleware 143, an application programming interface (API) 145, and/or application programs (or "applications") 147. At least part of the kernel 141, the middleware 143, and the API 145 may be designated as an operating system (OS).

The kernel 141 may control or manage system resources used to perform an operation or function implemented in other programs, and may provide an interface that enables the middleware 143, the API 145, or the applications 147 to access an individual component of the electronic apparatus 101 to thereby control or manage the system resources.

The middleware 143 may serve as a relay so that the API 145 or at least one of the applications 147 communicates with the kernel 141 to exchange data.

The middleware 143 may process one or more requests for operations received from at least one of the applications 147 according to priority. For example, the middleware 143 may assign at least one application 147 a priority for using a system resource of the electronic apparatus 101, and may process the one or more requests for operations according to the priority assigned to the at least one application program, thereby performing scheduling or load balancing for the one or more requests for operations.

The API 145 is an interface for the applications 147 to control a function provided from the kernel 141 or the middleware 143 and may include at least one interface or function for file control, window control, image processing, or text control.

The input/output interface 150 may deliver a command or data, which is input from a user or different external device, to a different component(s) of the electronic apparatus 101, and may output a command or data, which is received from a different component(s) of the electronic apparatus 101, to the user or different external device.

The display 160 may include a liquid crystal display (LCD), a light emitting diode (LED) display, an organic light emitting diode (OLED) display, a microelectromechanical systems (MEMS) display, and an electronic paper display. The display 160 may display various types of content, such as a text, image, video, icon, or symbol, for the user, and may include a touch screen that receives touch, gesture, proximity, or hovering inputs using an electronic pen or a user's body part.

The communication interface 170 may establish communication between the electronic apparatus 101 and an external device, such as a first external electronic apparatus 102, a second external electronic apparatus 104, or a server 106. For example, the communication interface 170 may be connected to a network 162 via wireless communication or wire-based communication to communicate with the external device.

The wireless communication may use a cellular communication protocol, which may be at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). The wireless communication may include short-range communication 164. The short-range communication 164 may include at least one of wireless fidelity (Wi-Fi), Bluetooth, near field communication (NFC), and global navigation satellite system (GNSS).

The GNSS may include at least one of a global positioning system (GPS), a global navigation satellite system (Glonass), a Beidou navigation satellite system (Beidou), and Galileo, which is the European global satellite-based navigation system, depending on a use area or bandwidth. In the present document, "GPS" may be interchangeably used with "GNSS". The wire-based communication may include at least one of universal serial bus (USB), high definition multimedia interface (HDMI), recommended standard 232 (RS-232), and plain old telephone service (POTS). The network 162 may include a telecommunications network, which may be at least one of a local area network (LAN) or wide area network (WAN), the Internet, and a telephone network, for example.

The first and second external electronic apparatuses 102 and 104 may each be a device of a type that is the same as, or different from, the electronic apparatus 101. According to embodiments, the server 106 may include a group of one or more servers. All or part of the operations performed in the electronic apparatus 101 may be performed in at least one other electronic apparatus. When the electronic apparatus 101 needs to perform a function or service automatically or by request, the electronic apparatus 101 may request another electronic apparatus to perform at least some functions related to the function or service, instead of, or in addition to, autonomously performing the function or service. The other electronic apparatus may perform the requested functions or additional function and may transmit the result to the electronic apparatus 101. The electronic apparatus 101 may provide the requested function or service by using the same received result or additionally processing the result. To this end, cloud, distributed, or client-server computing technologies may be used.

Figure 2:
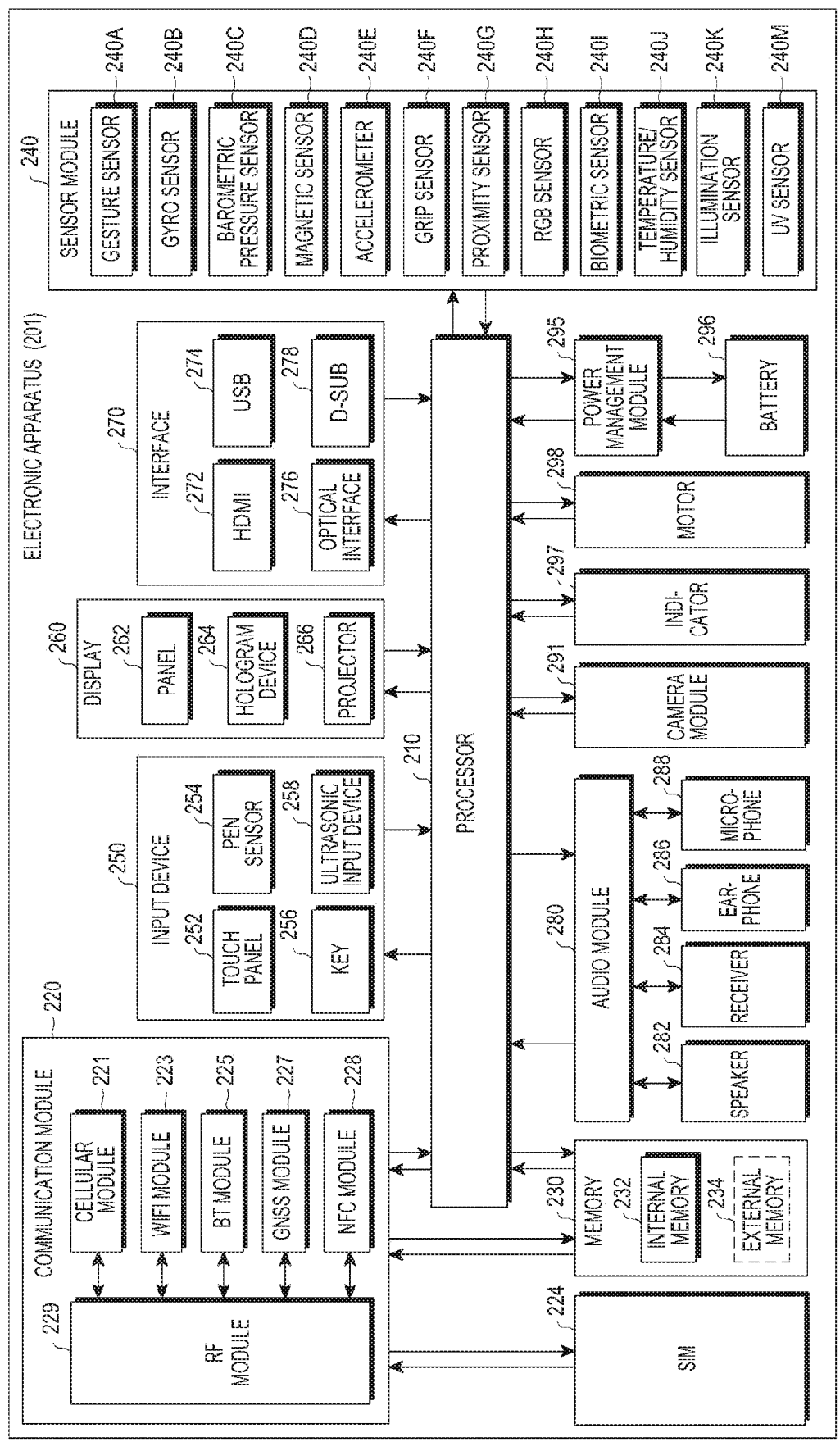
FIG. 2 is a block diagram of an electronic apparatus according to embodiments of the present disclosure.

FIG. 2 is a block diagram of an electronic apparatus 201 according to embodiments of the present disclosure.

The electronic apparatus 201 may include all or part of the electronic apparatus 101 illustrated in FIG. 1. The electronic apparatus 201 may include one or more processors 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processors 210 may run an OS or an application program to control a plurality of hardware or software components that are connected to the processors 210, may perform various types of data processing and operations, and may be configured as a system on chip (SoC). According to an embodiment, the processors 210 may further include a graphic processing unit (GPU) and/or an image signal processor, may include at least part of the components illustrated in FIG. 2, and may load a command or data received from at least one of other components, such as a nonvolatile memory, into a volatile memory to process the command or data and may store various types of data in the nonvolatile memory.

The communication module 220 may have a configuration that is the same as, or similar to, that of the communication interface 170 in FIG. 1, and may include a cellular module 221, a Wi-Fi module 223, a Bluetooth module (BT) 225, a GNSS module 227, a near field communication (NFC) module 228, and a radio frequency (RF) module 229.

The cellular module 221 may provide a voice call, a video call, a text messaging service, or an Internet service through a communication network. According to embodiments, the cellular module 221 may perform identification and authentication of the electronic apparatus 201 in a communication network using the SIM card 224, may perform at least part of the functions provided by the processors 210, and may include a communication processor (CP).

The Wi-Fi module 223, the Bluetooth module 225, the GNSS module 227, and the NFC module 228 may each include a processor to process data transmitted and received via the respective modules. According to an embodiment, at least two of the cellular module 221, the Wi-Fi module 223, the Bluetooth module 225, the GNSS module 227, and the NFC module 228 may be included in one integrated chip (IC) or IC package.

The RF module 229 may transmit and receive a communication signal (for example, an RF signal), and may include a transceiver, a power amplifier (amp) module (PAM), a frequency filter, a low noise amplifier (LNA), and an antenna. According to another exemplary embodiment, at least one of the cellular module 221, the Wi-Fi module 223, the Bluetooth module 225, the GNSS module 227, and the NFC module 228 may transmit and receive an RF signal through a separate RF module.

The SIM card 224 may include a card including an SIM and/or an embedded SIM and may include unique identification information, such as an integrated circuit card identifier (ICCID) or subscriber information, such as an international mobile subscriber identity (IMSI).

The memory 230 may include an internal memory 232 and an external memory 234. The internal memory 232 may include at least one of a volatile memory, such as a dynamic random-access memory (DRAM), a static RAM (SRAM), or a synchronous dynamic RAM (SDRAM), and a nonvolatile memory, such as a one-time programmable read-only memory (OTPROM), a programmable ROM (PROM), an erasable and programmable ROM (EPROM), an electrically erasable and a programmable ROM (EEPROM), a mask ROM, a flash ROM, a flash memory including a NAND or NOR flash, a hard drive, or a solid state drive (SSD).

The external memory 234 may further include a flash drive a compact flash (CF), a secure digital (SD) card, a micro secure digital (micro-SD) card, a mini secure digital (mini-SD) card, an extreme digital (xD) card, a multi-media card (MMC), and a memory stick, and may be functionally and/or physically connected to the electronic apparatus 201 through various interfaces.

The sensor module 240 may measure physical quantities or may detect an operation state of the electronic apparatus 201 and convert measured or detected information into an electrical signal, and may include at least one of a gesture sensor 240A, a gyro sensor 240B, a barometric pressure sensor 240C, a magnetic sensor 240D, an accelerometer 240E, a grip sensor 240F, a proximity sensor 240G, a color sensor 240H (for example, a red, green, and blue (RGB) sensor), a biometric sensor 240I, a temperature/humidity sensor 240J, an illumination sensor 240K, and an ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor, and a control circuit to control at least one or more sensors belonging thereto. The electronic apparatus 201 may further include a processor configured, as a part of or separately from the processors 210, to control the sensor module 240 while the processors 210 are in a sleep state.

The input device 250 may include a touch panel 252, a (digital) pen sensor 254, a key 256, and an ultrasonic input device 258. The touch panel 252 may use at least one of an electrostatic, pressure-sensitive, infrared, and ultrasonic type, and may further include a control circuit and a tactile layer to provide a user with a tactile response.

The (digital) pen sensor 254 may be part of the touch panel or include a separate recognition sheet. The key 256 may include a physical button, an optical key, or a keypad. The ultrasonic input device 258 may detect ultrasonic waves generated in an input tool through a microphone 288 and may identify data corresponding to the detected ultrasonic waves.

The display 260 may include a panel 262, a hologram device 264, and a projector 266. The panel 262 may include a configuration that is the same as, or similar to, that of the display 160 of FIG. 1, may be configured as flexible, transparent, or wearable, and may be formed with the touch panel 252 in a single module. The hologram device 264 may display a three-dimensional image in the air using the interference of light. The projector 266 may project light onto a screen to display an image. The screen may be disposed inside or outside the electronic apparatus 201. According to an embodiment, the display 260 may further include a control circuit to control the panel 262, the hologram device 264, and the projector 266.

The interface 270 may include a high-definition multimedia interface (HDMI) 272, a universal serial bus (USB) 274, an optical interface 276, or a D-subminiature (D-sub) 278, and may be included in the communication interface 170 illustrated in FIG. 1. Additionally or alternatively, the interface 270 may include a mobile high-definition link (MHL) interface, an SD card/MMC interface, or an infrared data association (IrDA) interface.

The audio module 280 may convert a sound and an electrical signal reciprocally. At least some components of the audio module 280 may be included in an input/output interface 150 illustrated in FIG. 1. The audio module 280 may process sound information input or output through a speaker 282, a receiver 284, earphones 286, or the microphone 288.

The camera module 291 photographs a still image and shoots video, and may include one or more image sensors (for example, a front sensor or a rear sensor), a lens, an image signal processor (ISP), or a flash (for example, an LED, and a xenon lamp.

The power management module 295 may manage the power of the electronic apparatus 201 that is supplied with power through a battery, without being limited thereto. According to an embodiment, the power management module 295 may include a power management integrated circuit (PMIC), a charger integrated circuit (IC), or a battery gauge. The PMIC may have wire-based and/or wireless charging methods. The wireless charging methods may include a magnetic resonance method, a magnetic induction method, or an electromagnetic wave method, and may further include an additional circuit for wireless charging, such as a coil loop, a resonance circuit, or a rectifier. The battery gauge may measure the remaining battery charge, the charging voltage, the current, or temperature of the battery 296, which may include a rechargeable battery and/or a solar battery.

The indicator 297 may display a specific state of the electronic apparatus 201 or a component thereof, which may be a booting, message, or charging state. The motor 298 may convert an electrical signal into mechanical vibrations and may generate vibrations or a haptic effect. The electronic apparatus 201 may include a processing device for supporting a mobile TV, such as a GPU which may process media data in accordance with digital multimedia broadcasting (DMB), digital video broadcasting (DVB), or mediaFlo™ standards.

Each of the above-described component elements of hardware according to the present disclosure may be configured with one or more components, and the names of the corresponding component elements may vary based on the type of electronic device. The electronic device according to embodiments of the present disclosure may include at least one of the aforementioned elements. Some elements may be omitted or other additional elements may be further included in the electronic device. Some of the hardware components according to embodiments may be combined into one entity, which may perform functions identical to those of the relevant components before the combination.

Figure 3:
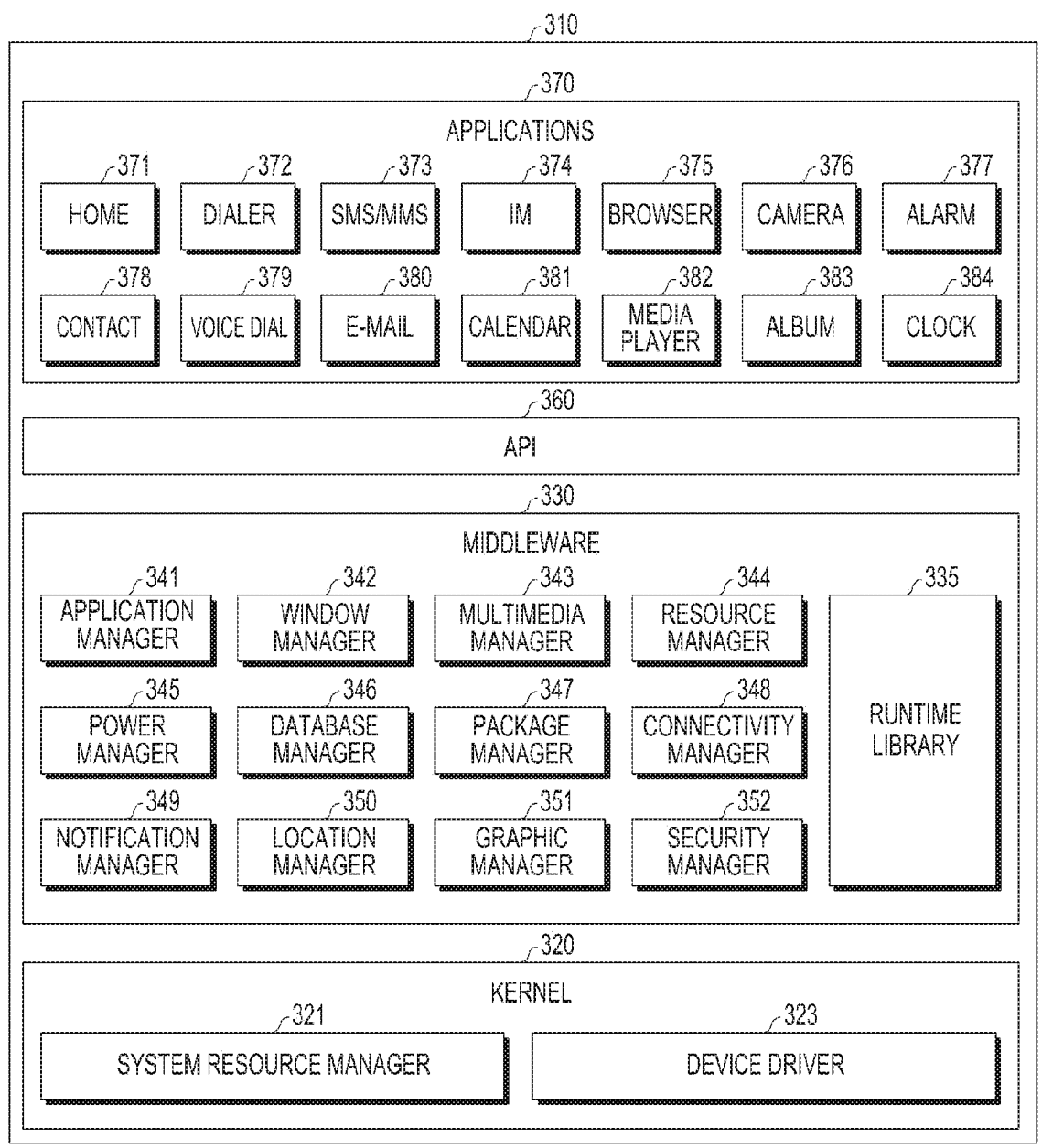
FIG. 3 is a block diagram of a program module according to embodiments of the present disclosure.

FIG. 3 is a block diagram of a program module according to embodiments of the present disclosure.

In FIG. 3, the program module 310 may include an OS that controls resources related to an electronic apparatus 101 and/or various applications that run on the OS, which may be Android™, iOS™, Windows™, Symbian™, Tizen™, or Samsung Bada™, for example.

The program module 310 may include a kernel 320, middleware 330, an API 360, and/or applications 370. At least part of the program module 310 may be preloaded onto the electronic apparatus or may be downloaded from an external electronic apparatus.

The kernel 320 may include a system resource manager 321 and/or a device driver 323. The system resource manager 321 may perform control, allocation, or recovery of system resources and may include a process manager, a memory manager, or a file system manager. The device driver 323 may include a display driver, a camera driver, a Bluetooth driver, a shared memory driver, a USB driver, a keypad driver, a Wi-Fi driver, an audio driver, or an inter-process communication (IPC) driver.

The middleware 330 may provide a function commonly needed for applications 370 or may provide the applications 370 with various functions through the API 360 so that the applications 370 may efficiently use limited systems resources in the electronic apparatus. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module used by a compiler to add a new function through a programming language while at least one of the applications 370 is running, and may perform functions for input/output management, memory management, or arithmetic function.

The application manager 341 may manage the life cycle of at least one application among the applications 370. The window manager 342 may manage graphic user interface (GUI) resources used for a screen. The multimedia manager 343 may identify formats that are necessary to play various media files and may encode or decode a media file using a codec suitable for a corresponding format. The resource manager 344 may manage resources, such as a source code, a memory, or a storage space, for at least one application among the applications 370.

The power manager 345 may operate with a basic input/output system (BIOS) to manage a battery or power supply and may provide information on power necessary for an operation of the electronic apparatus. The database manager 346 may generate, retrieve, or change a database used for at least one application among the applications 370. The package manager 347 may install or update an application distributed in the form of a package file.

The connectivity manager 348 may manage wireless connectivity via Wi-Fi or Bluetooth™. The notification manager 349 may display or report an incoming message, an appointment, and an event including a proximity notification in a manner that does not disturb a user. The location manager 350 may manage location information on the electronic apparatus. The graphic manager 351 may manage a graphic effect to be provided for the user or a user interface related to the graphic effect. The security manager 352 may provide overall security functions necessary for system security or user authentication. According to an embodiment, at least some functions of the execution manager 353 may be included in the API 360 or the applications 370.

When the electronic apparatus has phone features, the middleware 330 may further include a telephony manager to manage a voice or video call function of the electronic apparatus.

The middleware 330 may include a middleware module that forms combinations of various functions of the foregoing components, may provide a specialized module for each type of an OS in order to provide a differentiated function, and may dynamically delete some of the existing components or add new components.

The API 360 is a set of API programming functions and may be provided with a different configuration depending on an OS. For example, one API set for each platform may be provided in Android or iOS, while at least two API sets for each platform may be provided in Tizen.

The applications 370 may include one or more applications that are capable of performing functions of a home 371, dialer 372, short message service/multimedia messaging service (SMS/MMS) 373, instant message (IM) 374, browser 375, camera 376, alarm 377, contact 378, voice dial 379, email 380, calendar 381, media player 382, album 383, clock 384, and health care, such as for measuring exercise or blood sugar levels, and an environmental data application, for providing atmospheric pressure, humidity, or temperature data, for example.

According to an embodiment, the applications 370 may include an information exchange application that supports information exchanges between the electronic apparatus and an external electronic apparatus. The information exchange application may include a notification relay application for relaying specific information to the external electronic apparatus or a device management application for managing the external electronic apparatus.

For example, the notification relay application may include a function of relaying notification information, which is generated in another application of the electronic apparatus, to the external electronic apparatus. Additionally, the notification relay application may receive notification information from the external electronic apparatus and provides the notification information to the user.

The device management application may install, delete, or update at least one function, such as for turning on/turning off all or part of the external electronic apparatus or adjusting the resolution of a display of the external electronic apparatus communicating with the electronic apparatus, an application operating in the external electronic apparatus, or a call or message service provided by the external electronic apparatus.

According to an embodiment, the applications 370 may include a health care application of a mobile medical device, assigned according to an attribute of the external electronic apparatus. According to an embodiment, the applications 370 may include an application received from the external electronic apparatus. According to an embodiment, the applications 370 may include a third party application that may be downloaded from a preloaded application or the server. The illustrated components of the program module 310, according to embodiments, may be referred to by different terms depending on an OS type.

According to embodiments, at least part of the program module 310 may be implemented in software, firmware, hardware, or combinations of at least two, and may be run by a processor. At least part of the program module 310 may include a module, a program, a routine, sets of instructions, or a process to perform one or more functions.

Figure 4:
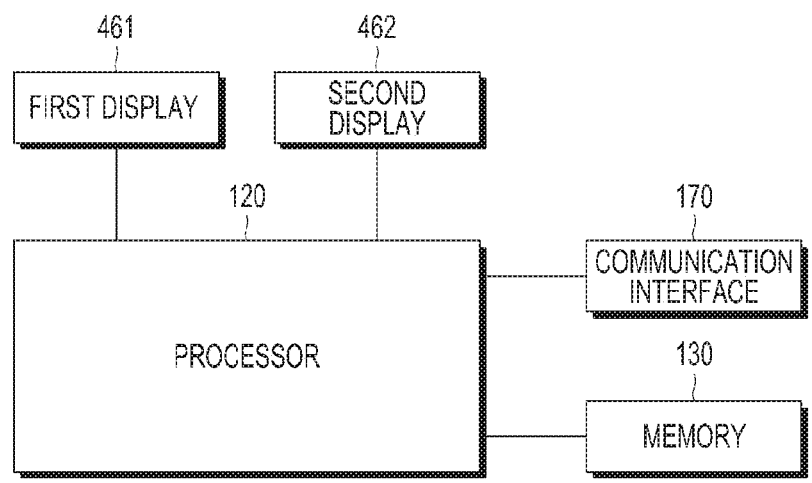
FIG. 4 is a block diagram of an electronic apparatus that displays an object according to embodiments of the present disclosure.

FIG. 4 is a block diagram of an electronic apparatus that displays an object according to embodiments of the present disclosure.

Referring to FIG. 4, the electronic apparatus 101 may include at least one of a first display 461, a second display 462, a communication interface 170, a memory 130, and a processor 120.

According to embodiments, at least one of the first display 461 and the second display 462 may perform at least one operation or function performed by the display 160 of FIG. 1. At least one of the first display 461 and the second display 462 may include a protection cover that protects the display, a touch panel that detects a touch, a display panel that displays at least one of object, and a pressure touch panel that detects a pressure touch, and may be configured such that the protection cover is disposed at the top of the layers of the electronic apparatus, the touch panel that detects a touch is disposed under the protection cover, the display panel that displays an object is disposed under the touch panel, and the pressure touch panel that detects a pressure touch is disposed under the display panel. In the present disclosure, in addition to such a configuration, the respective panels may be disposed at different positions in view of design or ease of use.

The first display 461 may be formed in a structure in which the first display slides on, or rotates about, the second display 462 to open and close. When the first display 461 covers the second display 462, the first display 461 may turn opaque. The electronic apparatus 101 may detect that the first display 461 is covering the second display 462 and may turn (or switch) the first display 461 to opaque corresponding to such a detection. The electronic apparatus 101 may be configured to detect a pressure touch input to at least one of the first display 461 and the second display 462, and the pressure touch may include a touch with at least a predetermined strength.

According to embodiments, the communication interface 170 may perform at least one operation or function performed by the communication interface 170 of FIG. 1, may provide object transmission and reception between the first display 461 and the second display 462, and may provide object transmission and reception to and from an external electronic apparatus through a wireless protocol, such as Wi-Fi or Bluetooth.

According to embodiments, the memory 130 may perform at least one operation or function performed by the memory 130 of FIG. 1, may store objects, applications, data, and information displayed on the first display 461 and the second display 462, and objects transmitted and received to and from the external electronic apparatus, and may store additional information on each application installed on the electronic apparatus 101, such as various pieces of information corresponding to the type, purpose, feature, or latest information on an application, and these various pieces of information may be stored in the memory 130 in a table by each application. The additional information may be stored in the table according to a priority of the type, purpose, or feature of the application or a user setting. When a new application is downloaded or installed, additional information on the new application may be updated to the table.

According to embodiments, the processor 120 may perform at least one operation or at least one function performed by the processor 120 of FIG. 1, may be configured to detect a pressure touch input on an object displayed on one of the first display 461 and the second display 462 and to display the object on the other display corresponding to the pressure touch, and may be configured to control an interaction of an object between the first display and the second display based on an application displayed on the second display. The processor 120 may display an object, which is displayed on one of the first display 461 and the second display 462, on the other display corresponding to a tap or pressure touch input to one of the first display 461 and the second display 462. The processor 120 may detect a movement of the first display that is sliding on the second display or is opening or closing.

According to embodiments, when a pressure touch is detected on an object displayed on the first display, the processor 120 may be configured to add the pressure touch-detected object to an application displayed on the second display and to display the application with the added object on the second display. The processor 120 may transmit the object, on which the pressure touch is detected on the first display, to the second display. When the pressure touch is detected on at least one object of the application, which is being displayed on the second display, the processor may be configured to display, on the first display, an object including additional information included in the at least one pressure touch-detected object. When a pressure touch is detected on an object displayed on the second display, the processor 120 may transmit the object including additional information included in the pressure touch-detected object to the first display. The additional information may vary depending on the type of the application and may include information on at least one function provided by the application.

According to embodiments, when a pressure touch is detected in an area where no object is displayed on the first display while the first display is superposed on the second display, i.e., a blank area that does not include an object and does not overlap an object, the processor may be configured to reconfigure an attribute of an object that is positioned corresponding to the detected pressure touch on the second display and to display the object with the reconfigured attribute on the first display. The processor 120 may determine whether the pressure touch is detected in the area where no object is displayed on the first display or in an area where an object is displayed when the first display is superposed on the second display.

According to embodiments, when a pressure touch is detected in an area where an object is displayed on the first display while the first display is superposed on the second display, the processor may be configured to enable the object on the first display, which is positioned at the detected pressure touch, to correspond to the application displayed on the second display and to display the configured application on the second display. The processor may be configured to detect a tap touch input on an application displayed on one of the first display and the second display, to display the content of a widget of the application on the other display corresponding to the tap touch, and to run the application corresponding to a tap touch on the displayed content of the widget.

The following are aspects according to embodiments of the present disclosure, as described above. An electronic apparatus 101 may include a first display, a second display, and a processor that may detect a pressure touch input on an object displayed on either of the first display and the second display, and may display the object on another display corresponding to the pressure touch.

The processor may control an interaction on an object between the first display and the second display based on an application displayed on the second display.

Each of the first display and the second display may include a protection cover, a touch panel that detects a touch, a display panel that displays at least one of object, and a pressure touch panel that detects a pressure touch.

The first display may be formed in a structure in which the display slides on, or rotates about, the second display to open and close.

When the pressure touch is detected on an object displayed on the first display, the processor may add the object, on which the pressure touch is detected, to an application displayed on the second display and may display the application, to which the object is added, on the second display.

When the pressure touch is detected on at least one object of an application displayed on the second display while the application is displayed on the second display, the processor may display, on the first display, an object including additional information included in the at least one object on which the pressure touch is detected.

The additional information may vary depending on a type of the application and may include information on at least one function provided by the application.

When the pressure touch is detected in an area where no object is displayed on the first display while the first display is superposed on the second display, the processor may reconfigure an attribute of an object positioned on the second display corresponding to the detected pressure touch and may display the object with the reconfigured attribute on the first display.

When the pressure touch is detected in an area where an object is displayed on the first display while the first display is superposed on the second display, the processor may configure the object positioned at the detected pressure touch on the first display to correspond to an application displayed on the second display and may display the configured application on the second display.

The processor may detect a tap touch that is input on an application displayed on any one of the first display and the second display, may display content of a widget of the application on another display corresponding to the tap touch, and may run the application corresponding to a tap touch on the displayed content of the widget.

The processor may detect the pressure touch with at least a predetermined strength that is input on any one of the first display and the second display.

Figure 5A:
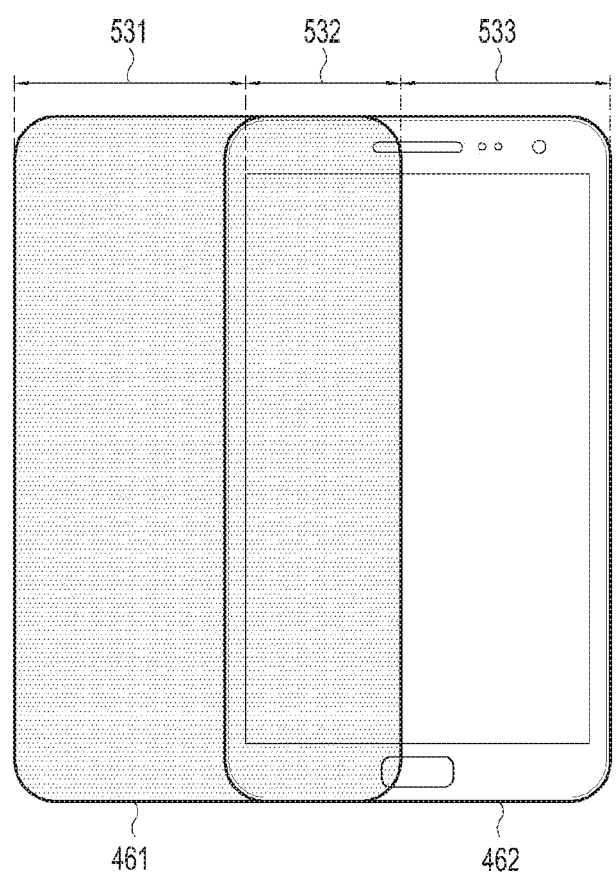
FIG. 5A illustrates a first display sliding on a second display to open and close according to an embodiment of the present disclosure.

When the first display covers the second display, the processor may turn the first display opaque. FIG. 5A illustrates that the first display 461 slides on the second display 462 to open and close according to an embodiment of the present disclosure, FIG. 5B illustrates a first display rotating about a second display to open and close according to an embodiment of the present disclosure, and FIG. 5C illustrates a layer structure of at least one of the first display 461 and the second display 462 according to an embodiment of the present disclosure.

Referring to FIG. 5A, the first display 461 may slide leftward or rightward based on the front of the second display 462, and may be formed of a transparent material and may detect not only an input including a tap, a touch, and a drag but also a pressure touch. The second display 462 may perform the same detections as the first display 461. When the first display 461 slides out on the second display 462, at least one object may be displayed in an area 531 that does not overlap the second display 462 and an object on the first display may be displayed to overlap an object on the second display in an area 532 that overlaps the second display 462.

When the first display 461 slides out on the second display, at least one object may be displayed and not only an input including a tap, a touch, and a drag but also a pressure touch may be detected in an area of the second display 462. FIG. 5A illustrates that the first display 461 slides leftward based on the second display 462, which is provided only for illustrative purposes, and the present disclosure may also include an instance in which the first display 461 slides rightward based on the second display 462.

Figure 5B:
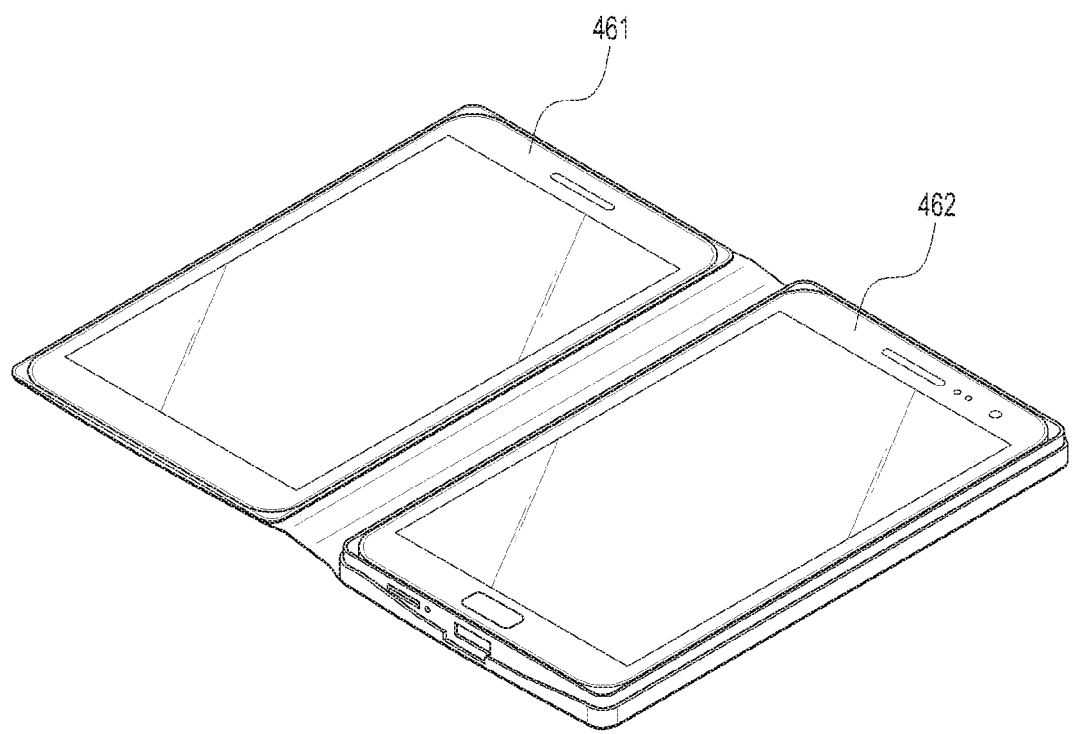
FIG. 5B illustrates a first display rotating about a second display to open and close according to an embodiment of the present disclosure.
Figure 5C:
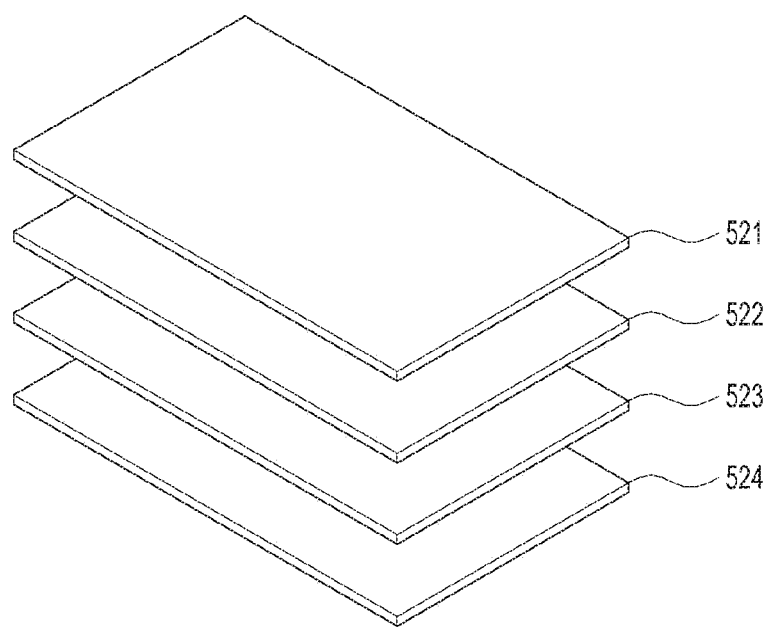
FIG. 5C illustrates a layer structure of at least one of the first display and the second display according to an embodiment of the present disclosure.

Referring to FIG. 5B, the first display 461 may be formed in a structure that rotates about the front of the second display 462 to open and close. The electronic apparatus 101 enables the first display 461 to rotate about the front of the second display 462 leftward to open and close. FIG. 5B illustrates the first display 461 rotating leftward about the second display 462 to open and close, which is provided only for illustrative purposes, and the present disclosure may include an instance in which the first display 461 rotates rightward about the second display 462 to open and close. The first display 461 may turn opaque when covering the second display 462.

Referring to FIG. 5C, at least one of the first display 461 and the second display 462 may include a protection cover 521, a touch panel 522 that detects a touch, a display panel 523 that displays at least one of object, and a pressure touch panel 524 that detects a pressure touch.

The protection cover 521 may be formed of a plastic or glass material in order to prevent the display from being damaged by an impact applied to the display. The touch panel 522 is a capacitive touch panel, in which both sides of a glass are coated with a thin metal conductive material, such as indium tin oxide (ITO), so that electric current flows on the surface of the glass, and are coated with a dielectric capable of storing electric charges. When a user touches the surface of the touch panel 522 with a finger, a certain quantity of electric charges are transferred by static electricity to the touched position, and the touch panel 252 recognizes the variation in electric current by charge transfer to detect the touched position. The touch panel 522 is capable of detecting any touch that generates static electricity.

The display panel 523 may be an LCD panel or an active matrix organic light-emitting diode (AMOLED) panel, for example, and may display various images according to various operating states, the execution of an application and a service, and a plurality of objects. The pressure touch panel 524 may detect pressure input onto an object displayed on the display, may measure the strength of the pressure input onto the object displayed on the display, may measure the strength of pressure of a touch made with a stylus pen or finger and may transmit a measured result to the processor 120.

At least one of the first display 461 and the second display 462 may be formed of a transparent material, may display an object, and may detect a touch by pressure.

Figure 6:
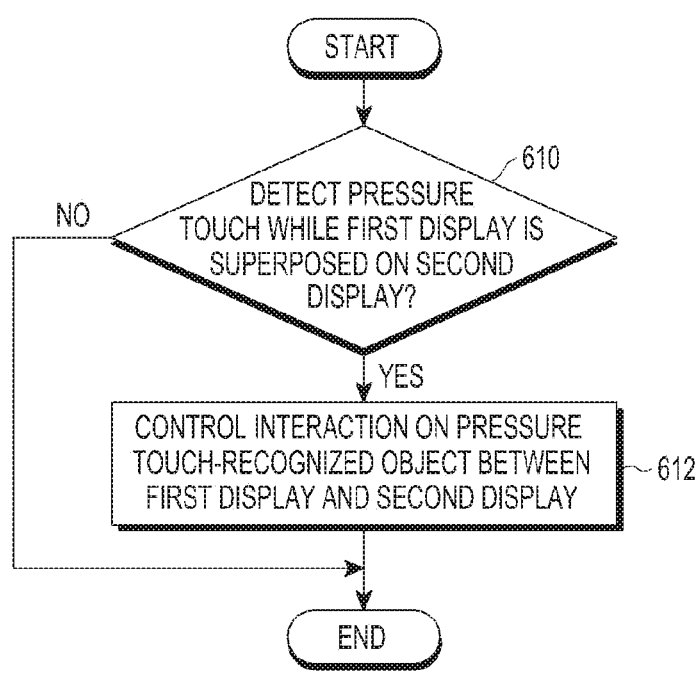
FIG. 6 illustrates a process of controlling an interaction on an object between the first display and the second display according to embodiments of the present disclosure.

FIG. 6 illustrates a process of controlling an interaction on an object between the first display 461 and the second display 462 according to embodiments of the present disclosure.

Referring to FIG. 6, in step 610, the electronic apparatus 101 may determine whether it detects a pressure touch that is input while the first display 461 is superposed on the second display 462. The electronic apparatus 101 may detect a pressure touch input on at least one of the first display 461 and the second display 462, which may each include a protection cover, a touch panel that detects a touch, a display panel that displays at least one of object, and a pressure touch panel that detects a pressure touch. Each of the first display 461 and the second display 462 may be configured such that the protection cover is disposed at the top of the layers of the electronic apparatus, the touch panel that detects a touch is disposed under the protection cover, the display panel that displays an object is disposed under the touch panel, and the pressure touch panel that detects a pressure touch is disposed under the display panel. In the present disclosure, in addition to such a configuration, the respective panels may be disposed at different positions in view of design or ease of use. The first display 461 may be formed in a structure in which the first display 461 slides on, or rotates about, the second display 462 to open and close. The electronic apparatus 101 may be configured to detect a pressure touch input to at least one of the first display 461 and the second display 462, and the pressure touch may include a touch with at least a predetermined strength which has a strength that is greater than the strength sensing a touch input.

In step 612, when the electronic apparatus 101 detects the pressure touch while the first display 461 is superposed on the second display 462, the electronic apparatus 101 may control an interaction on a pressure touch-recognized object between the first display 461 and the second display 462, and to control an interaction on an object between the first display 461 and the second display 462 based on an application displayed on the second display 462. The electronic apparatus 101 may detect a pressure touch input to an object displayed on the first display 461, may add the pressure touch-detected object to the application displayed on the second display, and may display the application with the added object on the second display. When the electronic apparatus 101 does not detect the touch pressure while the first display 461 is superposed on the second display 462 in step 610, the method ends.

According to embodiments, the electronic apparatus 101 may detect a pressure touch input to at least one object of the application, which is being displayed on the second display 462, and may display, on the first display, an object including additional information included in the at least one pressure touch-detected object. The additional information may vary depending on the type of the application and may include information on at least one function provided by the application. For example, when the application is a contact, the information may include a call icon and a text message icon. When the application is a music player application, the information may include an album, a title, a cover photo, and an album art.

According to embodiments, the electronic apparatus 101 may detect a pressure touch that is input in an area where no object is displayed on the first display 461 while the first display 461 is superposed on the second display 462. The electronic apparatus 101 may reconfigure an attribute of an object that is positioned corresponding to the detected pressure touch on the second display and may display the object with the reconfigured attribute on the first display.

According to embodiments, the electronic apparatus 101 may detect a pressure touch in an area where an object is displayed on the first display while the first display is superposed on the second display, may configure the object on the first display, which is positioned at the detected pressure touch, to correspond to the application displayed on the second display, and may display the configured application on the second display.

According to embodiments, the electronic apparatus 101 may detect a tap touch input on an application displayed on one of the first display and the second display, may display the content of a widget of the application on the other display corresponding to the tap touch, and may run the application corresponding to the tap touch on the displayed content of the widget. The following are aspects according to embodiments of the present disclosure, as described above. A method of displaying an object by an electronic apparatus 101 that includes a first display, a second display, and a processor may include detecting a pressure touch that is input on an object displayed on any one of the first display and the second display, and displaying the object on another display corresponding to the pressure touch.

Displaying the object on the other display may include controlling an interaction on an object between the first display and the second display according to an application displayed on the second display.

The method may further include detecting the pressure touch on an object displayed on the first display; adding the object, on which the pressure touch is detected, to an application displayed on the second display, and displaying the application, to which the object is added, on the second display.

The method may further include detecting the pressure touch on at least one object of an application displayed on the second display while the application is displayed on the second display, and displaying, on the first display, an object including additional information included in the at least one object on which the pressure touch is detected.

The additional information may vary according to a type of the application and may include information on at least one function provided by the application.

The method may further include detecting whether the first display is superposed on the second display, reconfiguring an attribute of an object positioned on the second display corresponding to the detected pressure touch when the pressure touch is detected in an area where no object is displayed on the first display, and displaying the object with the reconfigured attribute on the first display.

The method may further include detecting whether the first display is superposed on the second display, configuring an object positioned at the detected pressure touch on the first display to correspond to an application displayed on the second display when the pressure touch is detected in an area where the object is displayed on the first display, and displaying the configured application on the second display.

The method may further include detecting a tap touch that is input on an application displayed on any one of the first display and the second display, displaying content of a widget of the application on another display corresponding to the tap touch, and running the application corresponding to a tap touch on the displayed content of the widget. FIG. 7 illustrates an interaction on an object between the first display 461 and the second display 462 according to embodiments of the present disclosure, in which FIG. 7A illustrates a pressure touch being input while an object 710 is displayed on the first display 461, FIG. 7B illustrates the object displayed on the first display being displayed as an object 711 on the second display 462 by the pressure touch 730 input in FIG. 7A, FIG. 7C illustrates a pressure touch input on the first display corresponding to a position at which an object 720 is displayed on the second display 462, and FIG. 7D illustrates the object displayed on the second display being displayed as an object 721 on the first display 461 by the pressure touch 730 input in FIG. 7C.

Figure 7A:
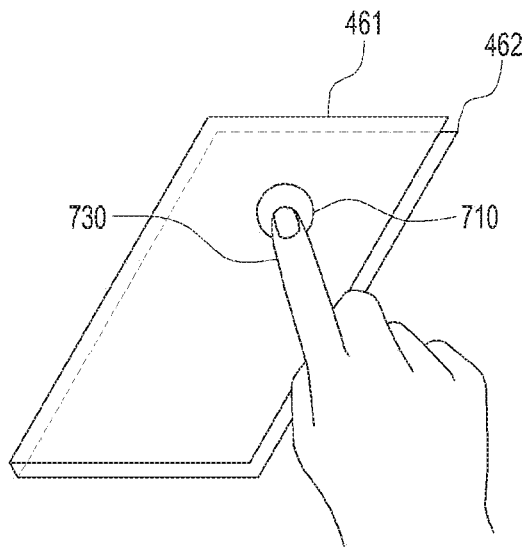
FIG. 7A illustrates a pressure touch being input while an object is displayed on the first display according to an embodiment of the present disclosure.
Figure 7B:
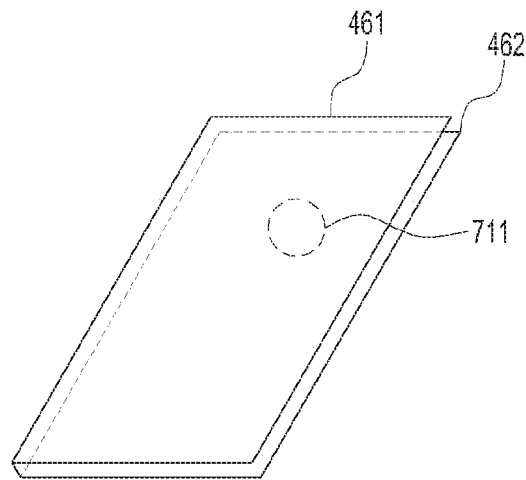
FIG. 7B illustrates the object displayed on the first display being displayed as an object on the second display by the pressure touch input in FIG. 7A.

Referring to FIGS. 7A and 7B, each of the first display 461 and the second display 462 according to embodiments may include a protection cover, a touch panel that detects a touch, a display panel that displays at least one of object, and a pressure touch panel that detects a pressure touch. Each of the first display 461 and the second display 462 may be configured such that the protection cover is disposed at the top of the layers of the electronic apparatus, the touch panel that detects a touch is disposed under the protection cover, the display panel that displays an object is disposed under the touch panel, and the pressure touch panel that detects a pressure touch is disposed under the display panel. In the present disclosure, in addition to such a configuration, the respective panels may be disposed at different positions in view of design or ease of use.

The first display 461 may be formed in a structure in which the first display 461 slides on, or rotates about, the second display 462 to open and close. The electronic apparatus 101 may display at least one object 710 on the first display 461, and may detect a pressure touch 730 input on the object 710 displayed on the first display 461 while the first display 461 displaying the at least one object 710 is overlapping the second display 462. The pressure touch may be of at least a predetermined strength. When the pressure touch is detected on the object 710 displayed on the first display 461, the electronic apparatus 101 may display the object 710 on the second display 462. The electronic apparatus 101 may transmit the object 710 displayed on the first display 461 to the second display 462 using a wireless protocol including wireless Internet platform for interoperability (WiPi) and Bluetooth and may control the second display 462 to display the object 711.

Figure 7C:
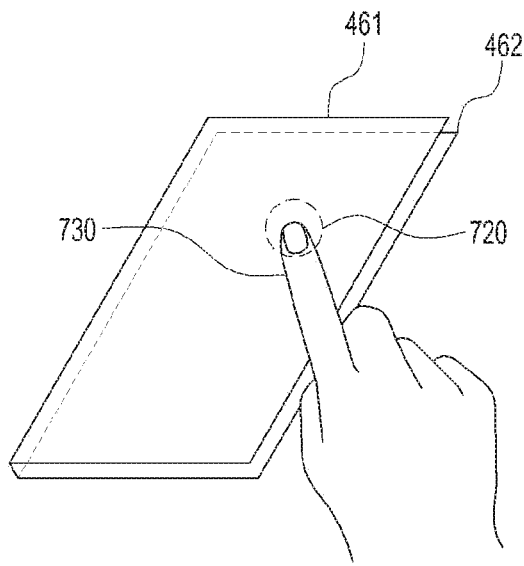
FIG. 7C illustrates a pressure touch input on the first display corresponding to a position at which an object is displayed on the second display according to an embodiment of the present disclosure.
Figure 7D:
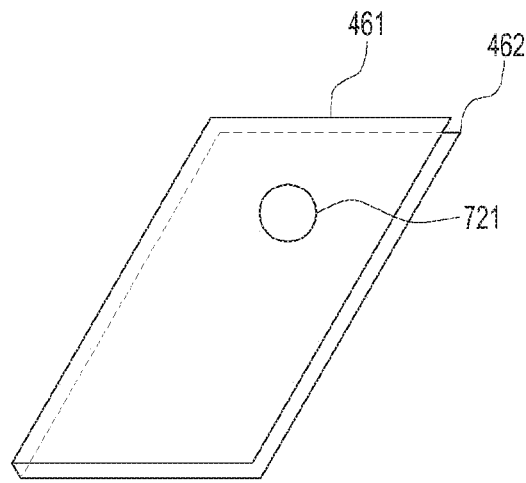
FIG. 7D illustrates the object displayed on the second display being displayed as an object on the first display by the pressure touch input in FIG. 7C.

Referring to FIGS. 7C and 7D, the electronic apparatus 101 may display at least one object 720 on the second display 462. The electronic apparatus 101 may determine that the first display 461 is superposed on the second display 462 displaying the at least one object 720 and may detect a pressure touch 730 input on the first display 461 corresponding to the position of the object 720 displayed on the second display 462. The pressure touch may include a touch of at least a predetermined strength.

When the pressure touch on the first display 461 is detected, the electronic apparatus 101 may display an object 721 on the first display 461, may transmit the object 720 displayed on the second display 462 to the first display 461 using a wireless protocol including WiPi and Bluetooth, and may control the first display 461 to display the object 721.

Figure 8:
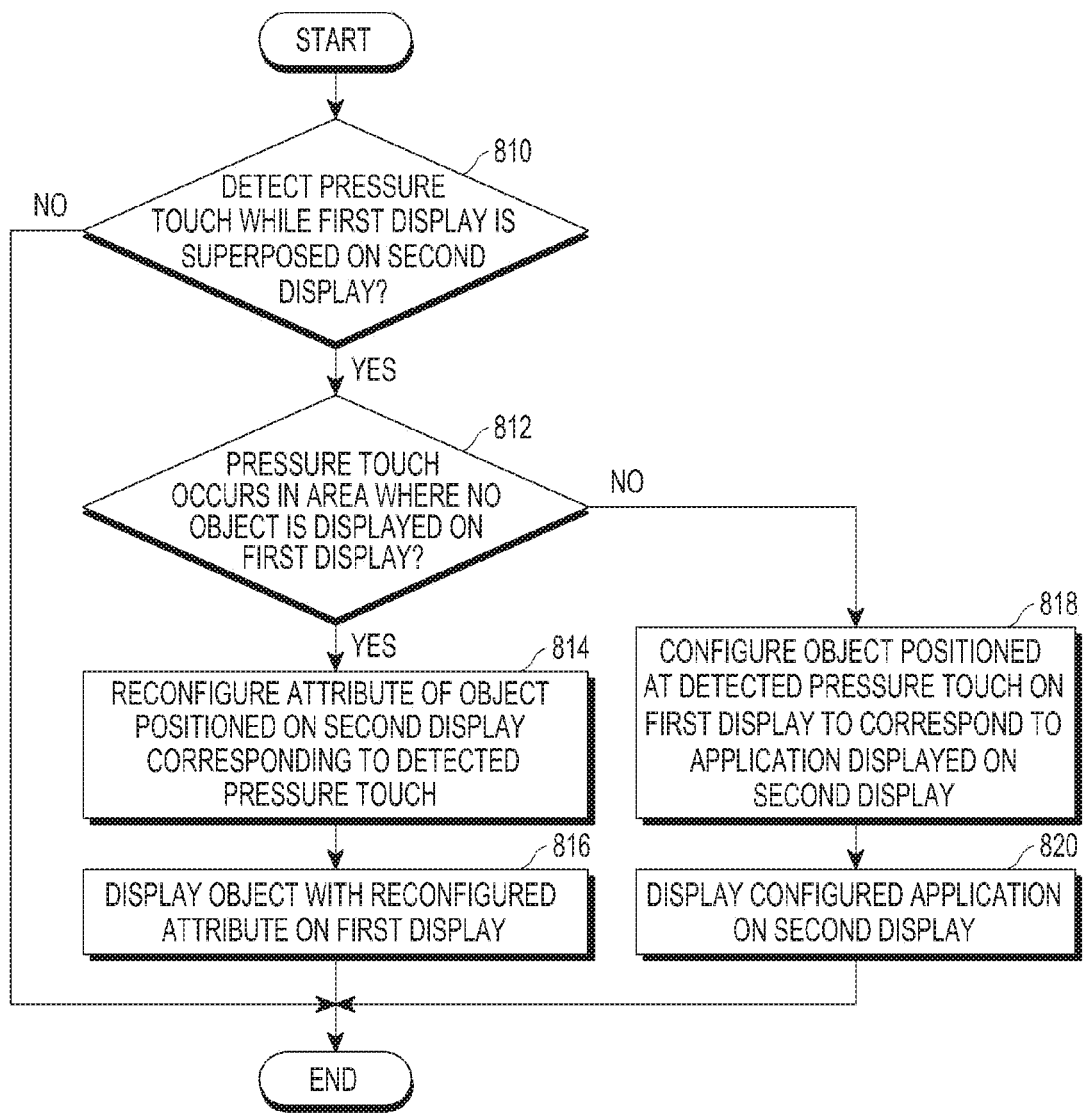
FIG. 8 illustrates a process of configuring an attribute of an object corresponding to the input of a pressure touch and displaying the object while the first display is superposed on the second display according to embodiments of the present disclosure.

FIG. 8 illustrates a process of configuring an attribute of an object corresponding to the input of a pressure touch and displaying the object while the first display 461 is superposed on the second display 462 according to embodiments of the present disclosure.

Referring to FIG. 8, in step 810, the electronic apparatus 101 may determine whether it detects a pressure touch that is input while the first display 461 is superposed on the second display 462. The electronic apparatus 101 may detect that the first display 461 does not overlap the second display 462, and may detect a pressure touch input on at least one of the first display 461 and the second display 462 while the first display 461 is superposed on the second display 462 or while the first display 461 does not overlap the second display 462. The pressure touch may include a touch with at least a predetermined strength. When the electronic apparatus 101 does not detect the touch pressure while the first display 461 is superposed on the second display 462 in step 810, the method ends.

In step 812, when the electronic apparatus 101 detects the pressure touch while the first display 461 is superposed on the second display 462, the electronic apparatus 101 may determine whether the pressure touch is detected in an area where no object is displayed on the first display 461, or alternatively, in an area on the first display 461 where an object is displayed. In step 814, when the pressure touch is detected in the area where no object is displayed on the first display 461, the electronic apparatus 101 may reconfigure an attribute of an object that is positioned on the second display corresponding to the detected pressure touch, and may determine that the pressure touch is a command to control the object displayed on the second display 462. The electronic apparatus 101 may be configured to display, on the first display, an object (or application) that is displayed on the second display 462 corresponding to a position at which the pressure touch is input, and may reconfigure an attribute of the object (or application) displayed on the second display 462 corresponding to the position at which the pressure touch is input. The reconfiguration may include various operations to display, on the first display 461, an object including additional information on the object (or application) displayed on the second display 462.

The memory 130 may store additional information on each application installed on the electronic apparatus 101. The additional information may include various pieces of information corresponding to the type, purpose, feature, or latest information on an application, and the various pieces of information may be stored in the memory 130 in a table by each application and according to a priority of the type, purpose, or feature of the application or a user setting. When a new application is downloaded or installed, additional information on the new application may be updated to the table. When the pressure touch is detected with the memory 130 storing the additional information on each application, the electronic apparatus 101 may read additional information on a pressure touch-detected application from the table stored in the memory 130. When the pressure touch is detected in the area where no object is displayed on the first display 461, the electronic apparatus 101 may read at least one piece of additional information suitable for the type, purpose, or feature of a pressure touch-detected application displayed on the second display 462 according to a priority or user setting and may reconfigure the object, may display the reconfigured object on the first display 461, and may convert the reconfigured object according to the type of another object previously displayed on the first display 461 and may display the converted object on the first display 461. In examples, when a contact is displayed on the second display, the electronic apparatus 101 may configure the object to include additional information (for example, a call or text message icon). When a music player application is displayed on the second display, the electronic apparatus 101 may configure the object to include additional information, such as an album, title, cover photo, or album art.

In step 816, the electronic apparatus 101 may display the object with the reconfigured attribute on the first display 461. When the pressure touch is detected in the area where no object is displayed on the first display 461, the electronic apparatus 101 may reconfigure the attribute of the object (or application) that is positioned corresponding to the detected pressure touch on the second display and may display the object on the first display 461.

In step 818, when the pressure touch is detected in the area where the object is displayed in step 812, the electronic apparatus 101 may configure the object positioned at the detected pressure touch on the first display 461 to correspond to an application displayed on the second display 462. When the pressure touch is detected in the area where the object is displayed on the first display 461 while the application is running on the second display 462, the electronic apparatus 101 may determine that the pressure touch is a command to add the object on the first display 461 to the application displayed on the second display 462.

The electronic apparatus 101 may be configured to display, on the second display 462, the object displayed on the first display 461 corresponding to the position at which the pressure touch is input or may be configured to add the object to the application displayed on the second display 462. The electronic apparatus 101 may reconfigure an attribute of the object displayed on the first display 461 corresponding to the position at which the pressure touch is input. The reconfiguration may include various operations to display, on the second display 462, an object including additional information on the object displayed on the first display 461. The electronic apparatus 101 may read at least one piece of additional information suitable for the type, purpose, or feature of a pressure touch-detected application displayed on the first display 461 according to a priority or user setting and may reconfigure the object, may display the reconfigured object on the second display 462, may convert the reconfigured object according to the type of another object previously displayed on the second display 462, and may display the converted object on the second display 462. For example, when a message sending application is displayed on the second display, the electronic apparatus 101 may add the object (for example, a picture) positioned at the position of the detected pressure touch to the message sending application displayed on the second display 462.

In step 820, the electronic apparatus 101 may display the configured object on the second display 462. When the pressure touch is detected in the area where the object is displayed, the electronic apparatus 101 may add the object (or application) positioned at the detected pressure touch on the first display 461 to the application displayed on the second display 462 and may display the application.

Figure 9A:
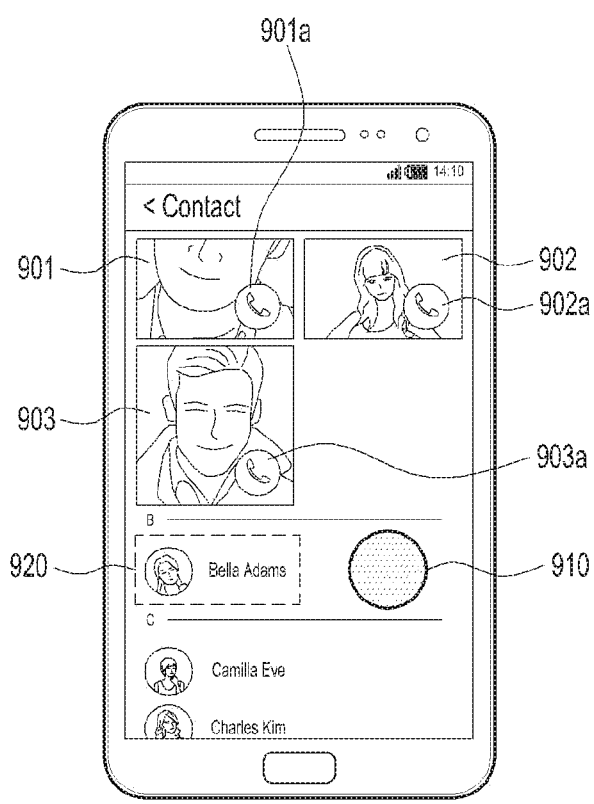
FIG. 9A illustrates a pressure touch being input in an area where no object is displayed on the first display while the first display is superposed on the second display.
Figure 9B:
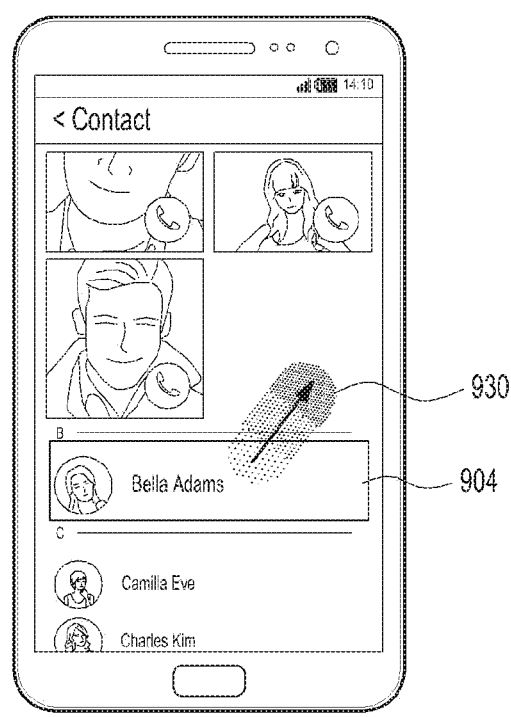
FIG. 9B illustrates an object on the second display being displayed on the first display by the pressure touch input in FIG. 9A.
Figure 9C:
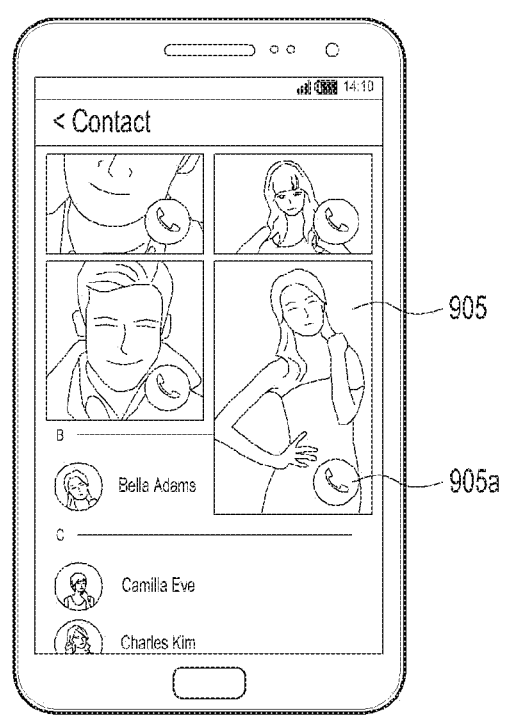
FIG. 9C illustrates the object displayed on the first display in FIG. 9B being reconfigured and displayed on the first display.

FIG. 9A, FIG. 9B, and FIG. 9C illustrate examples of configuring an attribute of an object corresponding to the detection of a pressure touch and displaying the object while the first display 461 is superposed on the second display 462 according to embodiments of the present disclosure. Specifically, FIG. 9A illustrates a pressure touch being input in an area where no object is displayed on the first display 461 while the first display 461 is superposed on the second display 462, FIG. 9B illustrates an object on the second display 462 being displayed on the first display 461 by the pressure touch input in FIG. 9A, and FIG. 9C illustrates the object displayed on the first display 461 in FIG. 9B being reconfigured and displayed on the first display 461.

Referring to FIG. 9A, the first display 461 may be formed in a structure in which the first display 461 slides on, or rotates about, the second display 462 to open and close. The electronic apparatus 101 may display at least one object 901, 902, and 903 on the first display 461, and may detect a pressure touch 910 that is input in an area where the at least one object 901, 902, and 903 is not displayed on the first display 461 while the first display 461 displaying the at least one object 901, 902, and 903 overlaps the second display 462.

The at least one object 901, 902, and 903 may include additional information indicating a function provided according to the type or attribute of an application running on the second display 462. For example, when a contact is displayed on the second display 462, the at least one object 901, 902, and 903 displayed on the first display 461 may include a call icon 901*a*, 902*a*, and 903*a*. When the pressure touch is detected in the area where the at least one object 901, 902, and 903 is not displayed on the first display 461, the electronic apparatus 101 may determine that the detected pressure touch is a command to control an object (or application) displayed on the second display 462, may display, on the first display 461, an object 920 displayed on the second display 462, and may transmit the object 920 displayed on the second display 462 to the first display 461.

Referring to FIG. 9B and FIG. 9C, the object 920, which is displayed on the second display 462 corresponding to the position of the detected pressure touch 910 that is input in the area where the at least one object 901, 902, and 903 is not displayed on the first display 461, may be transmitted to the first display 461 and may be displayed along with the at least one object 901, 902, and 903 previously displayed on the first display 461. The object 904 may be displayed in the same type as displayed on the second display 462 or may be displayed according to the attribute of the application displayed on the second display 462. For example, when a command 930 such as a touch, a touch and drag, or a tap is input while the object 904 is being displayed, the electronic apparatus 101 may reconfigure an attribute of the object 904 to display the object 904 on the first display 461, and may reconfigure the attribute of the object displayed on the second display 462 corresponding to the position at which the pressure touch is input. The reconfiguration may include various operations to display, on the first display 461, an object including additional information on the object displayed on the second display 462. For example, when a contact is displayed on the second display, the electronic apparatus 101 may read the object corresponding to the position at which the pressure touch is input from the memory 130 and may display the object on the first display 461. When the command is input on the object 904, the electronic apparatus 101 may configure the object to include additional information, such as a call or text message icon, and may display the object on the first display 461. When the command input on the object 904 displayed on the first display 461 is detected in FIG. 9B, the electronic apparatus 101 may reconfigure the object 904 to correspond to the at least one object 901, 902, and 903, and may display the reconfigured object 905 on the first display 461. The reconfigured object 905 may include various pieces of additional information to correspond to the attribute of the application displayed on the second display 462. For example, when the application displayed on the second display 462 is a contact, the reconfigured object 905 may include a call icon 905*a*.

Figure 10:
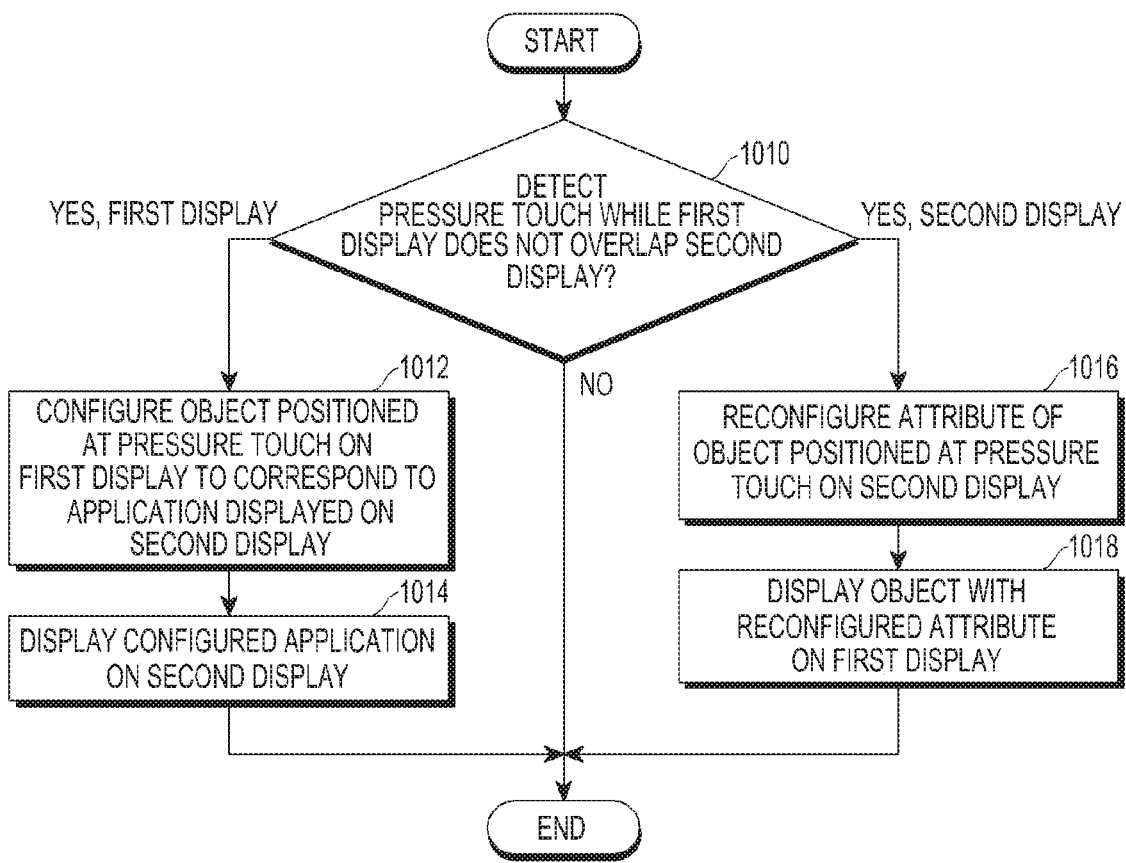
FIG. 10 illustrates a process of configuring an attribute of an object corresponding to the input of a pressure touch and displaying the object while the first display does not overlap the second display according to embodiments of the present disclosure.

FIG. 10 illustrates a process of configuring an attribute of an object corresponding to the input of a pressure touch and displaying the object while the first display 461 does not overlap the second display 462 according to embodiments of the present disclosure.

Referring to FIG. 10, in step 1010, the electronic apparatus 101 may determine whether it detects a pressure touch that is input while the first display 461 does not overlap the second display 462. The state in which the first display 461 does not overlap the second display 462 may be when the first display 461 opens so that it is possible to input a pressure touch on the second display 462, or may be when the first display 461 forms 180 degrees with the second display 462. The electronic apparatus 101 may detect a pressure touch that is input on at least one of the first display 461 and the second display 462 while the first display 461 is not superposed on the second display 462.

When the pressure touch that is input while the first display 461 does not overlap the second display 462 is not detected in step 1010, the method ends. When the pressure touch is detected in step 1010 and is input on the first display 461, the electronic apparatus 101 may configure an object positioned at the pressure touch on the first display 461 to correspond to an application displayed on the second display in step 1012, and may configure the object positioned at the detected pressure touch on the first display 461 to correspond to the application displayed on the second display 462.

When the pressure touch is detected in the area where the object is displayed on the first display 461 while the application is running on the second display 462, the electronic apparatus 101 may determine that the pressure touch is a command to add the object on the first display 461 to the application displayed on the second display 462, may be configured to display, on the second display 462, the object displayed on the first display 461 corresponding to a position at which the pressure touch is input, or may be configured to add the object to the application displayed on the second display 462.

The electronic apparatus 101 may reconfigure an attribute of the object displayed on the first display 461 corresponding to the position at which the pressure touch is input. The reconfiguration may include various operations to display, on the second display 462, an object including additional information on the object displayed on the first display 461. For example, when a message sending application is displayed on the second display, the electronic apparatus 101 may add the object (for example, a picture) positioned at the position of the detected pressure touch to the message sending application displayed on the second display 462.

In step 1014, the electronic apparatus 101 may display the configured application on the second display 462. When the pressure touch is detected in the area where the object is displayed on the first display 461, the electronic apparatus 101 may add the object (or application) positioned at the detected pressure touch on the first display 461 to the application displayed on the second display 462 and may display the application.

When the pressure touch is detected in step 1010 and is input on the second display 462, the electronic apparatus 101 may reconfigure an attribute of an object positioned at the pressure touch on the second display 462 in step 1016. The electronic apparatus 101 may be configured to display, on the first display, the object (or application) displayed on the second display 462 corresponding to a position at which the pressure touch is input, and may reconfigure the attribute of the object (or application) displayed on the second display 462 corresponding to the position at which the pressure touch is input. The reconfiguration may include various operations to display, on the first display 461, an object including additional information on the object (or application) displayed on the second display 462. In examples, when a contact is displayed on the second display, the electronic apparatus 101 may configure the object to include additional information. When a music player application is displayed on the second display, the electronic apparatus 101 may configure the object to include additional information, such as an album, title, cover photo, or album art.

According to embodiments, in step 1018, the electronic apparatus 101 may display the object with the reconfigured attribute on the first display 461. When the pressure touch is detected on the object displayed on the second display 462, the electronic apparatus 101 may reconfigure an attribute of the object (or application) positioned at the detected pressure touch on the second display 462 and may display the object on the first display 461.

Figure 11A:
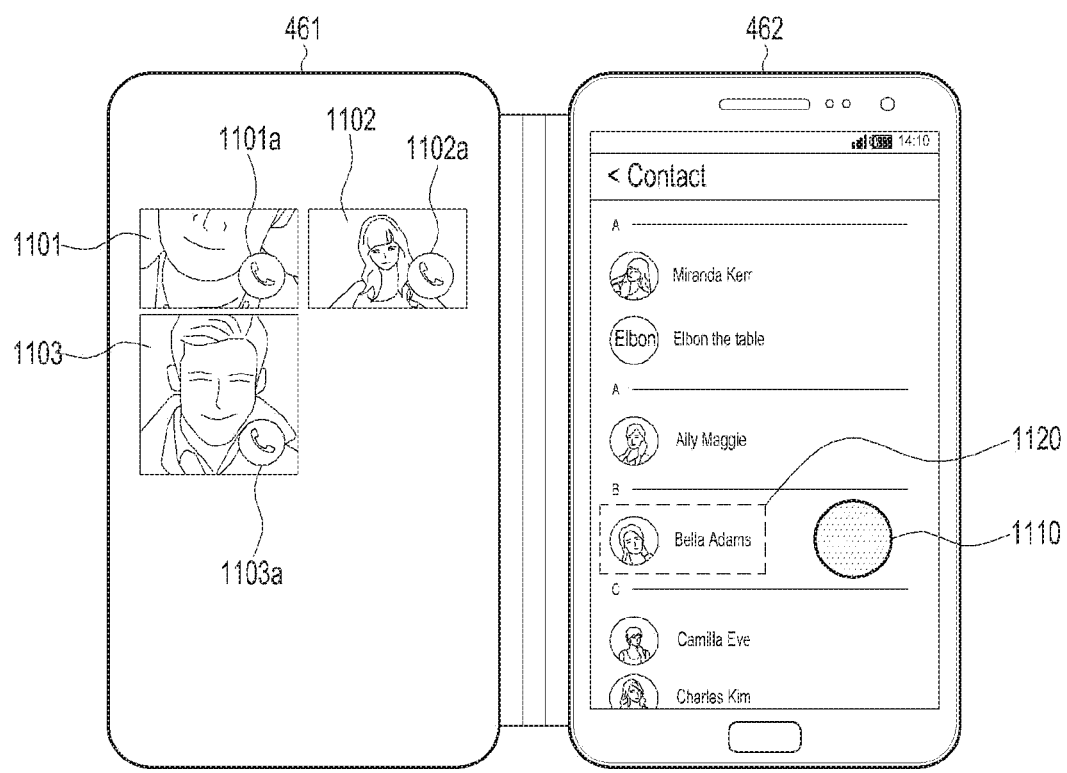
FIG. 11A illustrates a pressure touch being input on an object displayed on the second display while the first display does not overlap the second display.
Figure 11B:
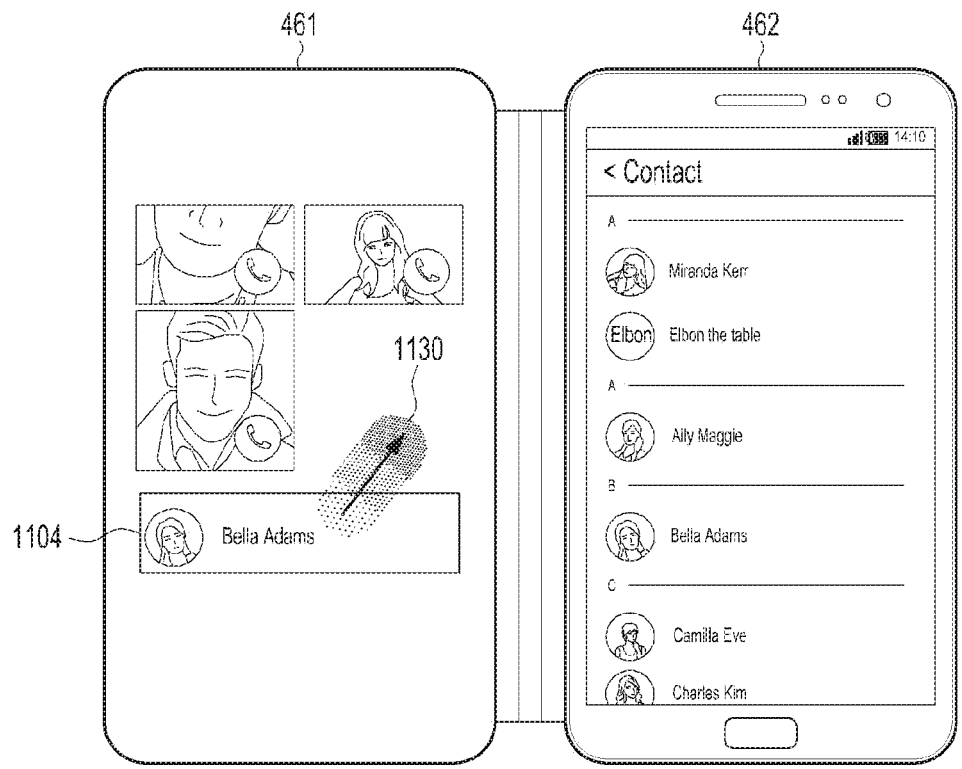
FIG. 11B illustrates the object on the second display being displayed on the first display by the pressure touch input in FIG. 11A.
Figure 11C:
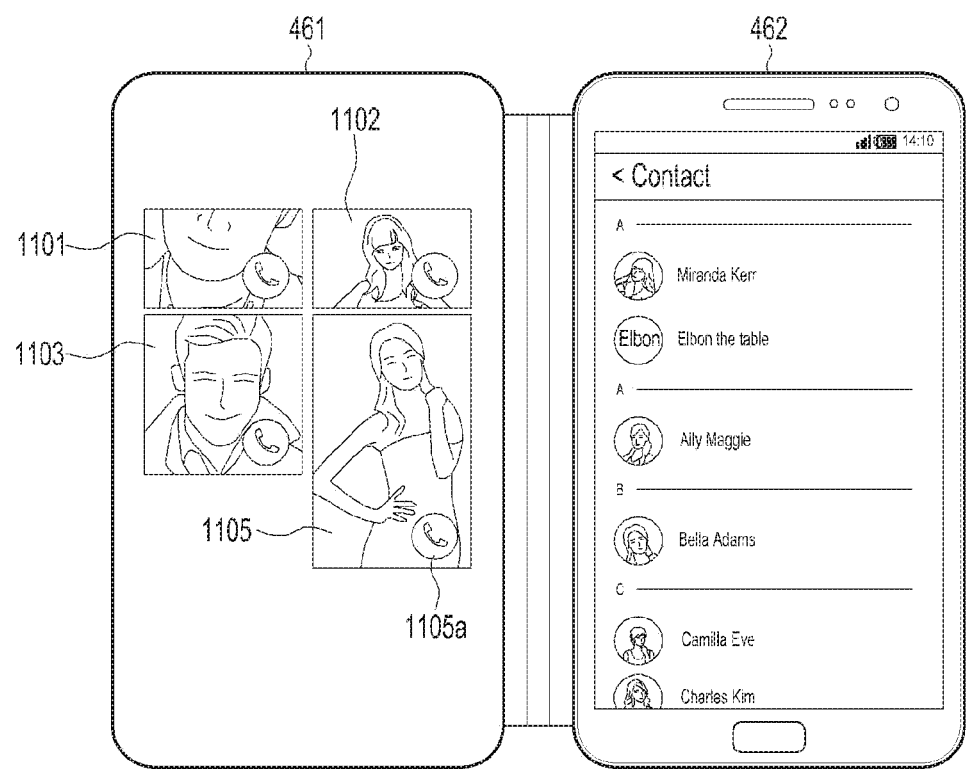
FIG. 11C illustrates the object displayed on the first display in FIG. 11B being reconfigured and displayed on the first display.

FIGS. 11A, 11B, and 11C illustrate examples of configuring an attribute of an object corresponding to the detection of a pressure touch and displaying the object while the first display 461 does not overlap the second display 462 according to embodiments of the present disclosure. Specifically, FIG. 11A illustrates a pressure touch being input on an object displayed on the second display 462 while the first display 461 does not overlap the second display 462, FIG. 11B illustrates the object on the second display being displayed on the first display 461 by the pressure touch input in FIG. 11A, and FIG. 11C illustrates the object displayed on the first display 461 in FIG. 11B being reconfigured and displayed on the first display 461.

Referring to FIG. 11A, the first display 461 may rotate about the second display 462 to open and close. The electronic apparatus 101 may display at least one object 1101, 1102, and 1103 on the first display 461, and may detect a pressure touch 1110 that is input on an object 1120 displayed on the second display 462 while the first display 461 displaying the at least one object 1101, 1102, and 1103 does not overlap the second display 462. The at least one object 1101, 1102, and 1103 displayed on the first display 461 may include additional information indicating a function provided according to the type or attribute of an application running on the second display 462. For example, when a contact is displayed on the second display 462, the at least one object 1101, 1102, and 1103 displayed on the first display 461 may include a call icon 1101a, 1102a, and 1103a. When the pressure touch is detected on the object 1120 displayed on the second display 462, the electronic apparatus 101 may determine that the detected pressure touch is a command to display, on the first display 461, the object displayed on the second display 462, and may transmit the object 1120 displayed on the second display 462 to the first display 461.

Referring to FIG. 11B and FIG. 11C, the object 1120, which is displayed on the second display 462 corresponding to the position of the detected pressure touch, may be transmitted to the first display 461 and may be displayed 1104 along with the at least one object 1101, 1102, and 1103 previously displayed on the first display 461. The object 1104 may be displayed in the same type as displayed on the second display 462 or may be displayed in a different type according to the attribute of the application displayed on the second display 462.

For example, when a command 1130, such as a touch, a touch and drag, or a tap is input while the object 1104 is being displayed, the electronic apparatus 101 may reconfigure an attribute of the object 1104 to display the object 1104 on the first display 461, and may reconfigure the attribute of the object displayed on the second display 462 corresponding to the position at which the pressure touch is input. The reconfiguration may include various operations to display, on the first display 461, an object including additional information on the object displayed on the second display 462. For example, when a contact is displayed on the second display, the electronic apparatus 101 may read the object corresponding to the position at which the pressure touch is input from the memory 130 and may display the object on the first display 461. When a command is input on the object 1104, the electronic apparatus 101 may configure the object to include additional information and may display the object on the first display 461. When the command input on the object 1104 displayed on the first display 461 is detected in FIG. 11B, the electronic apparatus 101 may reconfigure the object 1104 to correspond to the at least one object 1101, 1102, and 1103 and may display the reconfigured object 1105 on the first display 461. The reconfigured object 1105 may include various pieces of additional information to correspond to the attribute of the application displayed on the second display 462. For example, when the application displayed on the second display 462 is a contact, the reconfigured object 1105 may include a call icon 1105a.

Figure 12:
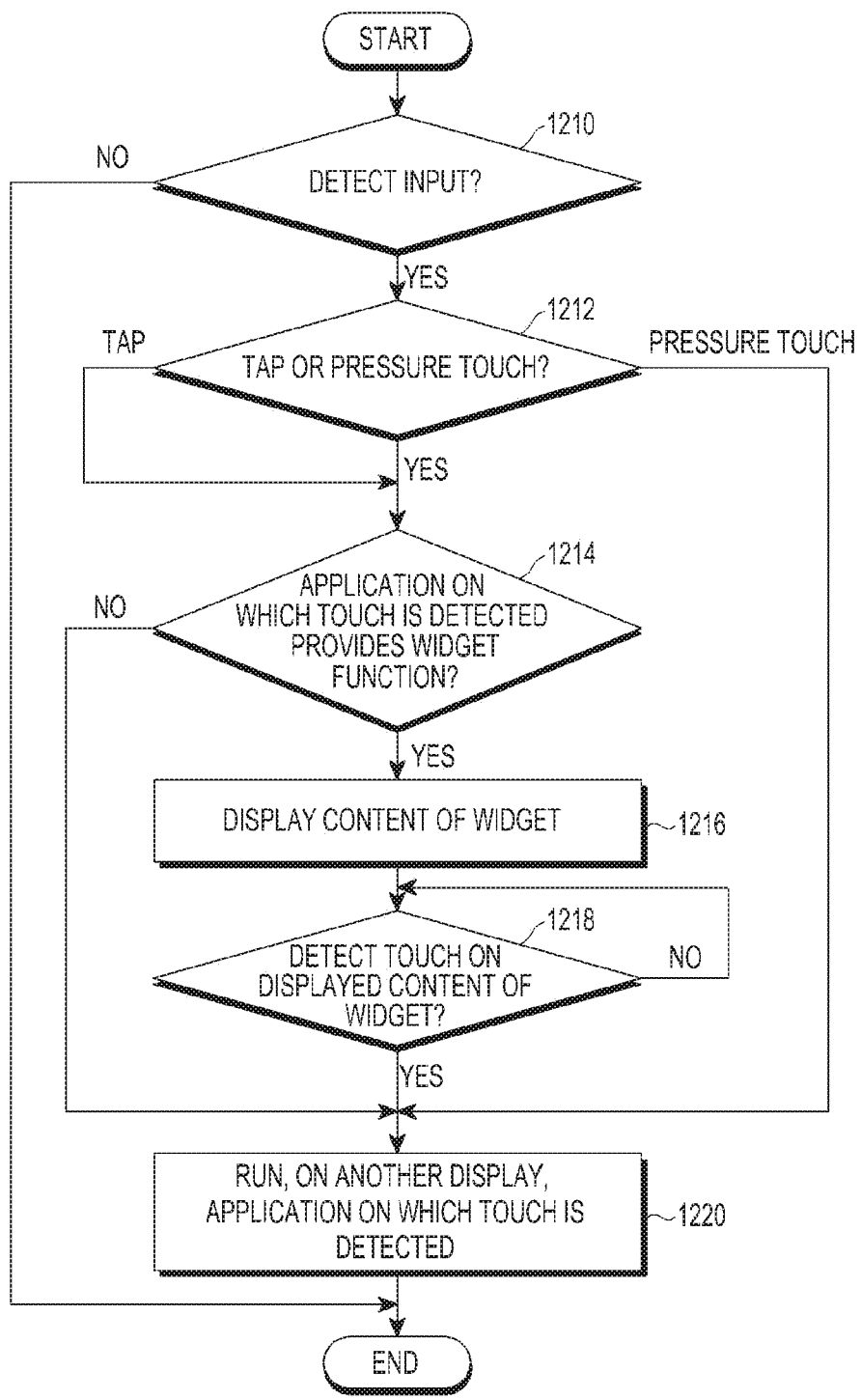
FIG. 12 illustrates a process of running an application depending on whether the application provides a widget function according to embodiments of the present disclosure.

FIG. 12 illustrates a process of running an application depending on whether the application provides a widget function according to embodiments of the present disclosure.

In step 1210, the electronic apparatus 101 may determine whether it detects an input that is made on at least one of the first display 461 and the second display 462 while the first display 461 and the second display 462 do not overlap, such as when the first display 461 opens so that it is possible to input a touch on the second display 462. The input may be made by a gesture or various touches, such as a touch, a tap, a drag and drop, a swipe, a flick, and a pressure touch.

When the electronic apparatus 101 does not detect the input in step 1210, the method ends. In step 1212, when the electronic apparatus 101 detects the input in step 1210, the electronic apparatus 101 may determine whether the input is a tap or a pressure touch. The electronic apparatus 101 may determine whether the input that is made in step 1210 is made on the first display 461 or on the second display 462, and is an input by a tap or an input by a pressure touch. When the detected input is a pressure touch in step 1212, the electronic apparatus 101 may run an application on which the pressure touch is detected and may display the application on another display in step 1220.

When the input is a tap in step 1212, the electronic apparatus 101 may determine whether an application on which the touch is detected provides a widget function in step 1214. The widget function may or may not be provided according to the type or attribute of the application, and may include a function providing (or displaying) brief information on the application.

When the application provides a widget function in step 1214, the electronic apparatus 101 may display the content of a widget of the application in step 1216. For example, when the application is an application providing a health function, if a tap is detected on the application, the electronic apparatus 101 may display the brief content of the widget, such as a current day's step count or calorie consumption, on a display on which the application is displayed or on another display. When the application does not provide a widget function in step 1214, the method proceeds to step 1220, previously described.

In step 1218, the electronic apparatus 101 may determine whether a touch is detected on the displayed content of the widget. The electronic apparatus 101 may detect an input by a tap on the displayed content of the widget.

When the touch on the displayed widget content is detected in step 1218, the electronic apparatus 101 may run, on another display, the application on which the touch is detected, in step 1220. Otherwise, step 1218 is repeated. The electronic apparatus 101 may run, on the other display, the application on which the pressure touch is detected. For example, when an input by a tap is made on the application while the second display 462 is displaying the application, the electronic apparatus 101 may display the content of the widget of the application on the first display 461. When a pressure touch is detected on the content of the widget, the electronic apparatus 101 may run the application corresponding to the content of the widget and may display the application on the second display 462.

Figure 13B:
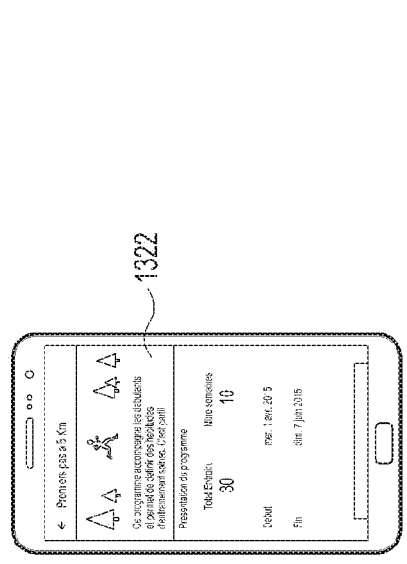
FIGS. 13A, 13B, 13C, 13D, 13E and 13F illustrate the execution of an application that provides a widget function according to embodiments of the present disclosure.
Figures 13A, 13C:
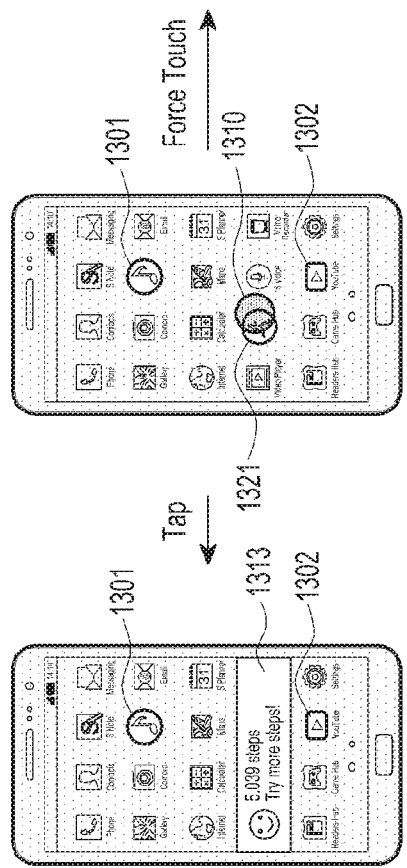
Figure 13E:
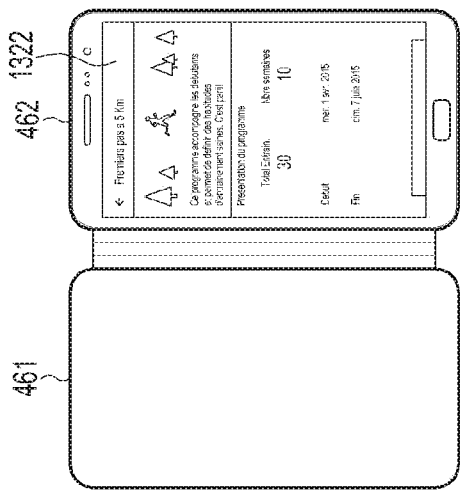
Figure 13D:
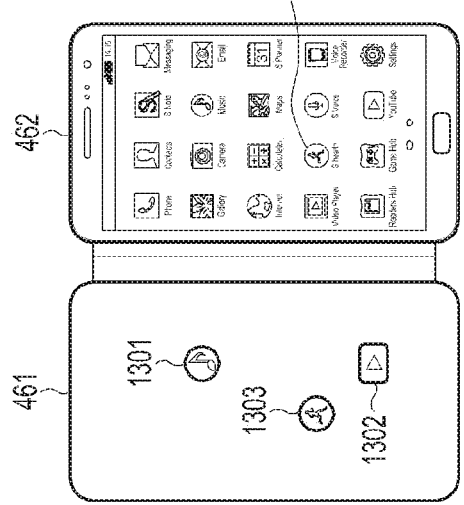
Figure 13F:
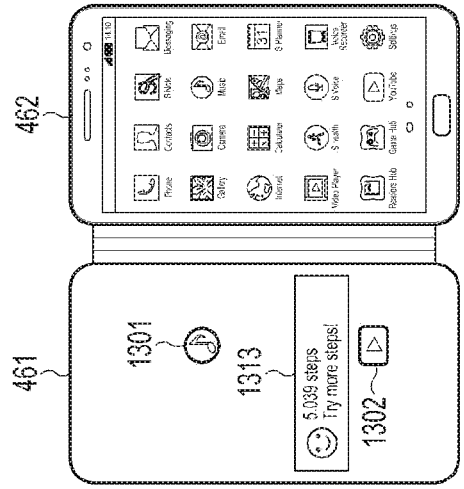

FIGS. 13A, 13B, 13C, 13D, 13E and 13F illustrate the execution of an application that provides a widget function according to embodiments of the present disclosure, in which FIG. 13A illustrates that the first display 461 displaying at least one application is superposed on the second display 462, FIG. 13B illustrates a pressure touch being input in FIG. 13A, FIG. 13C illustrates that a tap is input in FIG. 13A, FIG. 13D illustrates that the first display 461 displaying at least one application does not overlap the second display 462, FIG. 13E illustrates a pressure touch being input in FIG. 13D, and FIG. 13F illustrates that a tap is input in FIG. 13D.

Referring to FIGS. 13A, 13B and 13C, the first display 461 and the second display 462 may each display an icon indicating at least one application. The first display 461 may be formed in a structure that slides on the second display 462 to open and close. The electronic apparatus 101 may display at least one object 1301 and 1302 on the first display 461, and may display at least one object 1321 on the second display 462.

The electronic apparatus 101 may detect a pressure touch 1310 that is input in an area where at least one of the objects 1301 and 1302 is not displayed on the first display 461 while the first display 461 displaying the at least one object 1301 and 1302 is overlapping the second display 462. The pressure touch may include a touch with at least a predetermined strength. When the pressure touch is detected in the area where the at least one object 1301 and 1302 is not displayed on the first display 461, the electronic apparatus 101 may determine that the pressure touch is a command to control the object displayed on the second display 462. The object 1321 displayed on the second display 462 corresponding to a position at which the pressure touch is detected may be run by the pressure touch and may be displayed 1322 on the second display 462.

The electronic apparatus 101 may detect a tap 1310 that is input in the area where the object 1301 and 1302 is not displayed on the first display 461 while the first display 461 displaying the at least one object 1301 and 1302 is overlapping the second display 462. When the tap is detected in the area where the at least one object 1301 and 1302 is not displayed on the first display 461, the electronic apparatus 101 may determine that the tap is a command to control the object displayed on the second display 462. The object 1321 displayed on the second display 462 corresponding to a position at which the tap is detected may display 1313 the content of a widget on the first display 461 by the tap. For example, when a pressure touch is detected on the content of the widget, the electronic apparatus 101 may run an application corresponding to the content of the widget and may display the application on the second display 462. The electronic apparatus 101 may transmit and receive data, such as object widget content or a result of running an application, between the first display 461 and the second display 462 using a wireless protocol including WiPi and Bluetooth.

Referring to FIGS. 13D, 13E and 13F, the first display 461 and the second display 462 may each display an icon indicating at least one application. The first display 461 may be formed in a structure that rotates about the second display 462 to open and close. The electronic apparatus 101 may display at least one object 1301, 1302, and 1303 on the first display 461, and may display at least one object 1321 on the second display 462. An object 1303 displayed on the first display 461 may be the same as the object 1321 displayed on the second display 462.

The electronic apparatus 101 may detect a pressure touch that is input on any one object 1303 among the objects 1301, 1302, and 1303 on the first display 461 or on the object 1321 displayed on the second display 462 while the first display 461 displaying the at least one object 1301, 1302, and 1303 is not overlapping the second display 462. When the pressure touch is detected, the electronic apparatus 101 may determine that the pressure touch is a command to control any one object 1303 among the objects 1301, 1302, and 1303 on the first display 461 or the object 1321 displayed on the second display 462. The object 1303 displayed on the first display 461 corresponding to a position at which the pressure touch is detected may be run by the pressure touch and may be displayed 1322 on the second display 462. The object 1321 displayed on the second display 462 corresponding to the position at which the pressure touch is detected may be run by the pressure touch and may be displayed 1322 on the second display 462.

The electronic apparatus 101 may detect a tap that is input on any one object 1303 among the objects 1301, 1302, and 1303 on the first display 461 while the first display 461 displaying the at least one object 1301, 1302, and 1303 is not overlapping the second display 462. When the tap is detected, the electronic apparatus 101 may determine that the tap is a command to control the object displayed on the second display 462. The object 1321 displayed on the second display 462 corresponding to a position at which the tap is detected may display 1313 the content of a widget on the first display 461 by the tap. For example, when a pressure touch is detected on the content of the widget, the electronic apparatus 101 may run an application corresponding to the content of the widget, may display the application on the second display 462, and may transmit and receive data between the first display 461 and the second display 462 using a wireless protocol including WiPi and Bluetooth.

FIGS. 14A, 14B, 14C, 14D, 14E, 14F, 14G and 14H illustrate an interaction on an object between the first display 461 and the second display 462 by a tap or pressure touch according to embodiments of the present disclosure, in which FIG. 14A illustrates that at least one object is displayed on the first display 461 and an application to interact with the at least one object is displayed on the second display 462, FIG. 14B illustrates a result of inputting a tap on the first display 461 in FIG. 14A, FIG. 14C illustrates that the first display 461 is slid to overlap the second display, and FIG. 14D illustrates a result of inputting a pressure touch 1413 while the first display 461 overlaps the second display 462.

Referring to FIGS. 14A, 14B, 14C and 14D, the first display 461 may display at least one object, and an application may be run on the second display 462. When a tap 1411 is input on a random object on the first display 461, the electronic apparatus 101 may enlarge 1412 the object positioned at the tap according to the size of the first display 461 and may display the object. The first display 461 may be slid in a direction to the second display 462. When a pressure touch 1413 is detected when the first display 461 has been slid in the direction to the second display 462, the electronic apparatus 101 may add the object displayed on the first display to the application 1421 displayed on the second display. When the pressure touch 1413 is detected on the first display while an application, such as a message or an email, is run on the second display, an object 1412 at a position of the detected pressure touch 1413 may be added to the application 1421 run on the second display. When the object displayed on the first display is added to the application displayed on the second display, the object 1412 displayed on the first display may no longer be displayed on the first display.

Referring to FIGS. 14E, 14F, 14G and 14H, the first display 461 may display at least one object, and an application may be run on the second display 462. When a tap 1411 is input on a random object on the first display 461, the electronic apparatus 101 may enlarge 1412 the object positioned at the tap according to the size of the first display 461 and may display the object. When a pressure touch 1413 is detected on the first display 461, the electronic apparatus 101 may add the object displayed on the first display 461 to the applications 1421 displayed on the second display 462. For example, when the pressure touch 1413 is detected on the first display 461 while at least one of the applications 1421, such as a message and an email, is run on the second display 462, an object 1412 at a position of the detected pressure touch 1413 may be added to the at least one of the applications 1421 run on the second display 462. When the object displayed on the first display 461 is added to the applications 1421 displayed on the second display 462, the object 1412 displayed on the first display may not be displayed on the first display any longer.

The term "module" used in the present disclosure may refer to a unit including one or more combinations of hardware, software, and firmware, may be used interchangeably with a unit, logic, logical block, component, or circuit, may be a minimum unit of an integrated component element or a part thereof, or a minimum unit for performing one or more functions or a part thereof, and may be mechanically or electronically implemented. For example, the "module" according to the present disclosure may include at least one of an application-specific integrated circuit (ASIC) chip, a field-programmable gate array (FPGA), and a programmable-logic device for performing operations which has been known or are to be developed in the future.

According to embodiments, at least some of the modules or functions thereof or the method according to the present disclosure may be implemented by a command stored in a computer-readable storage medium in a programming module form. When the command is executed by control circuits, the control circuits may perform a function corresponding to the command. The computer-readable storage medium may be the memory 130. At least some of the programming modules may be executed by the control circuits, and may include a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to embodiments of the present disclosure may be executed sequentially, in parallel, repeatedly, or in a heuristic manner. Some operations may be executed according to another order or may be omitted, or other operations may be added. According to embodiments, a storage medium may record commands, and the commands may include a first command set to detect a pressure touch that is input on an object displayed on any one of the first display and the second display and a second command set to display the object on the other display corresponding to the pressure touch.

Embodiments of the present disclosure described in this specification and the drawings correspond to specific examples presented in order to easily describe technical contents of the present disclosure and to assist in the comprehension of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a first display;
a second display;
a memory; and
at least one or more processor,
wherein the at least one or more processor is configured to, while the first display is superposed on the second display:
detect a pressure touch on a first position of the first display, and
when a first object is displayed on the first position of the first display, display a second object associated with the first object on the second display based on information regarding the first object stored in the memory in response to the detection of the pressure touch, wherein a visual representation of the second object is different from a visual representation of the first object,
when the first object is displayed on a position of the second display which corresponds to the first position of the first display and no object is displayed on the first position of the first display, display the second object associated with the first object on the first display based on information regarding the first object stored in the memory in response to the detection of the pressure touch.

2. The electronic apparatus of claim 1, wherein each of the first display and the second display comprises a protection cover, a touch panel that detects a touch, a display panel that displays at least one of object, and a pressure touch panel that detects a pressure touch.

3. The electronic apparatus of claim 1, wherein the first display is formed in a structure in which the first display slides on, or rotates about, the second display to open and close.

4. The electronic apparatus of claim 1, wherein the second object is identified based on the information regarding the first object corresponding to an application which provides the second object and comprises information on at least one function provided by the second application.

5. The electronic apparatus of claim 1, wherein the processor is further configured to detect a tap touch that is input on the first object on the first display, and provide a function corresponding to the first object.

6. The electronic apparatus of claim 1, wherein the processor is further configured to identify a touch with at least a predetermined strength as the pressure touch.

7. The electronic apparatus of claim 1, wherein, when the first display covers the second display, the processor is further configured to turn the first display opaque.

8. A method of displaying an object by an electronic apparatus that comprises a first display, a second display, a memory, and at least one or more processor, the method comprising:

while the first display is superposed on the second display:

detecting a pressure touch on a first position of the first display, and when a first object is displayed on the first position of the first display, displaying a second object associated with the first object on the second display based on information regarding the first object stored in the memory in response to the detection of the pressure touch, wherein a visual representation of the second object is different from a visual representation of the first object, when the first object is displayed on a position of the second display which corresponds to the first position of the first display and no object is displayed on the first position of the first display, displaying the second object associated with the first object on the first display based on information regarding the first object stored in the memory in response to the detection of the pressure touch.

9. The method of claim 8, wherein the second object is identified based on the information regarding the first object corresponding to an application which provides the second object and comprises information on at least one function provided by the second application.

10. A non-transitory computer-readable recoding medium having recorded thereon a program comprising a method to display an object in an electronic apparatus that comprises a first display, a second display, a memory, and at least one or more processor, the method comprising:

while the first display is superposed on the second display:

detecting a pressure touch on a first position of the first display, and when a first object is displayed on the first position of the first display, displaying a second object associated with the first object on the second display based on information regarding the first object stored in the memory in response to the detection of the pressure touch, wherein a visual representation of the second object is different from a visual representation of the first object, when the first object is displayed on a position of the second display which corresponds to the first position of the first display and no object is displayed on the first position of the first display, displaying the second object associated with the first object on the first display based on information regarding the first object stored in the memory in response to the detection of the pressure touch.

\* \* \* \* \*